United States Patent [19]

Hyde-Thomson

[11] Patent Number: 5,557,659
[45] Date of Patent: Sep. 17, 1996

[54] ELECTRONIC MAIL SYSTEM HAVING INTEGRATED VOICE MESSAGES

[76] Inventor: Henry C. A. Hyde-Thomson, 11 North Terrace, London SW3 2BA, England

[21] Appl. No.: 361,019

[22] Filed: Dec. 21, 1994

Related U.S. Application Data

[63] Continuation of Ser. No. 80,318, Jun. 22, 1993, abandoned.

[51] Int. Cl.⁶ .................................................... H04M 3/50
[52] U.S. Cl. ........................... 379/88; 379/67; 379/233
[58] Field of Search ................................. 379/67, 88, 89, 379/94, 96, 100, 233

[56] References Cited

U.S. PATENT DOCUMENTS

| | | | |
|---|---|---|---|
| 4,734,931 | 3/1988 | Bourg et al. | 379/93 |
| 4,739,509 | 4/1988 | Bourg | 379/93 |
| 4,748,656 | 5/1988 | Gibbs et al. | 379/93 |
| 4,811,381 | 3/1989 | Woo et al. | 379/233 X |
| 4,837,798 | 6/1989 | Cohen et al. | 379/94 X |
| 4,866,758 | 9/1989 | Heinzelmann | 379/96 X |
| 4,972,462 | 11/1990 | Shibata | 379/94 X |
| 4,996,704 | 2/1991 | Brunson | 379/88 X |
| 5,008,926 | 4/1991 | Misholi | 379/94 X |
| 5,117,451 | 5/1992 | Ladd et al. | 379/67 |
| 5,127,003 | *6/1992 | Doll, Jr. et al. | 370/110.1 |
| 5,179,585 | 1/1993 | MacMillan, Jr. et al. | 379/89 X |
| 5,253,285 | 10/1993 | Alheim | 379/97 X |
| 5,255,305 | 10/1993 | Sattar | 379/97 X |
| 5,333,266 | 7/1994 | Boaz et al. | 395/200 |

OTHER PUBLICATIONS

Lee et al. "Meridian SL Information Services" 1985, pp. 15 and 18 Bell Northern Research Limited.
Morimoto et al. "A Case of Members Management in a Multimedia Mail System" IEICE Technical Report, Apr. 1987 SE–87 pp. 1–6.
McNinch, "Screen Based Telephony" IEEE Communications Magazine Apr. 1990, pp. 34–38.
TeleConnect, Jan. 1988 p. 39 "A New twist in Fax".

*Primary Examiner*—Jeffery Hofsass
*Assistant Examiner*—Daniel S. Hunter
*Attorney, Agent, or Firm*—Haverstock & Associates

[57] ABSTRACT

In a computer network having a plurality of interconnected terminals and a shared memory device for storing digital data, a message handling system for sending and retrieving both voice and text messages over the computer network. A voice message is input either through a phone associated with one of the computer terminals or via a remote phone. The voice message is converted into a digital voice file which is stored on the shared memory device corresponding to the intended recipient's mailbox. Thereby, one mailbox can contain both voice and text messages. The same message handling mechanism is used for handling both voice and text messages. A list of the messages currently stored for each mailbox can be pulled for display by their respective terminals. A selected voice message may be selected for playback over the phone. Likewise, a text message may be selected for display by the terminal. Call answering and remote playback functions are also provided.

1 Claim, 17 Drawing Sheets

PROVIDING MESSAGE SUMMARY FOR REVIEW

MESSAGE PLAYBACK OF SAVED/OLD MESSAGES

SENDING A MESSAGE FROM ONE USER TO ANOTHER OVER THE TELEPHONE

CALL ANSWERING OPERATION

REPLYING TO A MESSAGE DURING MESSAGE PLAYBACK

SCANNING THE MAILBOX TO GET MESSAGE COUNTS

MESSAGE PLAYBACK OF NEW MESSAGES

SENDING A MESSAGE FROM ONE USER TO ANOTHER OVER THE TELEPHONE

REPLYING TO A MESSAGE DURING MESSAGE PLAYBACK

ELECTRONIC MAIL SYSTEM HAVING INTEGRATED VOICE MESSAGES

This is a File Wrapper Continuation of application Ser. No. 08/080,318 filed on Jun. 22, 1993, now abandoned.

FIELD OF THE INVENTION

The present invention pertains to the field of voice processing. More particularly, the present invention relates to a mechanism for integrating voice messaging with an electronic text messaging system.

BACKGROUND OF THE INVENTION

Since the advent of telephone communications, callers have frequently failed to make contact with the person they are calling either because that person is on another line, away from the phone, or otherwise preoccupied. Time and effort are wasted by playing telephone tag. This problem is especially acute in the business environment as customers are faced with unanswered calls, extended waits on hold, unconveyed important information, etc. Communication within an organization between employees is also a problem because of availability at the same time of the people who need to communicate. Time zone differences, especially in regards to international calls, particularly aggravate this issue.

Traditionally, a caller who cannot get hold of the person they are trying to contact could leave a message with a receptionist or secretary. However, written messages are notoriously prone to inaccuracies and are practically limited in length. Furthermore, this approach only works during business hours when the receptionist or secretary is available to pick up the incoming call.

In response to the shortcomings of handwritten messaging, electronic voice and text messaging systems have been developed. A number of voice and text messaging systems are known in the art and are commercially available. A voice messaging system is used to automate the answering of incoming calls from the outside telephone network and the taking of messages when the extensions are not answered by the called parties. Voice message systems are also used for people using any standard DTMF (Dual Tone Multi-Frequency) phone to call the voice message system and create messages that are then addressed and sent to one or more select other users of the system. Such voice messaging systems incorporate features, such as the recording of voice messages for users in what are known as "mailboxes". Commonly, voice messaging systems may also be accessed by users calling from PBX extensions or from the telephone network over incoming trunks to access their mailbox to listen to voice messages.

In most known voice messaging systems, answering of incoming trunk calls by the voice messaging system is accomplished by instructing the PBX to direct the incoming calls to a group of extensions. Voice ports of the voice messaging system are coupled with this group of extensions and appear to the PBX simply as single line telephone sets in a hunt group. Typically, the voice messaging system will answer a call directed to it and provide a pre-recorded voice message allowing the caller to "log-on" (i.e., enter a user identification number and security code) to access their mailbox in order to listen to or send voice messages. Internal users on the PBX can directly call the group of extensions in the hunt group to access the voice messaging system.

In addition to handling calls received by the PBX from incoming telephone trunks and direct internal calls, an important function of known voice messaging systems is the handling of calls which do not successfully reach the originally intended extension either because the extension was busy, did not answer, or had intentionally been placed in a mode in which it was not accepting calls. Such a function may be accomplished in known voice messaging systems by instructing the PBX to forward all such unanswered calls to a group of extensions coupled with the voice ports of the voice messaging system. As is know in the prior art, for example U.S. Pat. No. 4,926,462, voice message systems are also connected to the PBX in such a way as to receive information about the originally called extension number so that the voice message system can answer the call with the greeting of the called party and take a voice message that goes into the voice mailbox for that called person.

Another mechanism which has been used for the transmission and receipt of text messages involves computers. With the advent of personal computers and workstations, computing power was distributed to users at the desktop level. As is well know in the prior art, these personal computers (PCs) and workstations can be connected using Local Area Network (LAN) and Wide Area Network (WAN) hardware and software technology.

The interconnection of PCs and workstations into networks is becoming increasingly popular and one of the most common applications is that of electronic mail (E-mail). E-mail allows users to compose, send, and receive messages on their PCs or workstations over a LAN or WAN. Originally, E-mail systems only handled text-based messages. Increasingly, they are being enhanced to also support the transmission of other formats of information, such as graphics, spread sheets, facsimile, and voice.

Most of the E-mail systems available for PC network environments require a file server computer on the LAN. The most popular file server LAN software system is sold by Novell™ (Netware™) or Microsoft™ (LAN Manager™). These software systems allow programs on individual PCs to access files on a computer running the file server software. These files can either be shared access or assigned to a particular individual. They also support what are called "peer-to-peer" communications protocols, which allow PCs to send and receive data to and from other PCs on the LAN.

The E-mail software running on a particular user's PC uses a file server on a LAN as the "post office" for the mail messages. As an example, there is a shared file on the server that is the "user directory". It has information such as each users' E-mail addresses and passwords. The file server is also where the messages are stored when they are waiting to be accessed by a user. The server also contains information for each user regarding how many messages they have, the date and time of creation of each message, who it is from, who else was copied, etc. This information is sometimes called a message header or "envelope" information. Also supported in these E-mail systems is the ability to send E-mail messages to other E-mail systems located on a different LAN (usually via a dedicated WAN connection or via dial-up modems). In these cases there is software running on one of the PCs on the LAN that handles the moving of messages and of all the message header information from one file server via the WAN to another file server. There is also software that keeps the directories of these different LAN based E-mail systems automatically updated.

As indicated previously, the E-mail systems also support the ability to attach other files that are stored on the server as part of the E-mail message. In some E-mail systems, the names of these attached files might also be part of the message header information. These E-mail systems typically have available Application Program Interfaces (APIs) which allow software programs to be written to use the E-mail directory, message handling, user access and security mechanisms of that particular E-mail system for facilitating the development of other applications. The two most common LAN based E-mail systems are Microsoft Mail™ and Lotus cc:Mail™. Microsoft™ supports a set of APIs called Messaging Application Program Interface (MAPI) and Lotus™ supports, as do other software companies, APIs called Vendor Independent Messaging (VIM).

In prior art voice messaging systems, the methods for keeping track of user directories, message header information, and the messages themselves is unique to each manufacturer. Virtually all these methods are different from the methods the E-mail software systems use to perform the same functions for E-mail. This means that a business organization that has both E-mail and voice messaging must maintain two user directories, two mailboxes per user, and two wide area networking and directory update systems. This is both inconvenient for the users and more expensive to manage for the business.

Therefore, there exists a need in the prior art for an integrated voice and electronic messaging system. Such an integrated system would allow companies to maintain only one directory for all voice and E-mail users, maintain only one method of wide area networking both kinds of messages, and give the users only one mailbox to check and use for all types of messages (e.g., voice, fax, text, graphic, etc.).

SUMMARY OF THE INVENTION

In the present invention, the APIs of a commercially available E-mail system and the ability to attach voice files as part of an E-mail message are used to implement a voice messaging system. The voice file is created by using a board in a PC which connects to a phone system to accept incoming phone calls and to convert the analog voice signal into a digital format. For the purposes of this disclosure this will be called the voice gateway PC. Conversely, the digital format is converted back to the analog voice signal for playback of a stored voice file. A voice message is recorded by storing the digital voice data on the file server using a uniquely created file name. To send a voice message, the voice file stored on the server is attached to an E-mail message and "sent" using the appropriate API. For receiving a voice message, the voice file attached to an E-mail message is retrieved and transferred to the gateway PC. Thereupon, the board which is connected to a phone system converts the voice file from a digital format to an analog voice signal for playback over the phone line.

There are three methods of creating and sending voice messages. In the first method, a user at his PC can elect to send an E-mail message by using the standard E-mail message software. But instead of just typing in the text of a message, he can access another application running on his PC to send a peer-to-peer message to the voice gateway PC on the LAN. The voice gateway PC is connected to the phone system so that it can call the phone associated with the user's PC in order to record a voice message. When he answers the phone, the gateway PC records his voice message using the voice board and writes the digitized voice data onto the file server with a unique file name and attaches that file name to the E-mail message that is waiting to be sent.

In the second method, an unanswered call to a particular user's phone will be forwarded to a phone port of the voice gateway PC. The PBX informs the PC of that particular extension which did not answer. The voice gateway PC converts the extension number to an E-mail address, plays a personal greeting file pre-recorded by the user, and records the caller's voice message onto the server. It will then select the appropriate E-mail APIs necessary for sending an E-mail with the attached voice file to the user's E-mail address.

In the third method, a user directly calls the voice gateway PC. By using signals from his DTMF phone, which are translated by the phone interface board on the PC to digital signals, the user enters his extension number and E-mail password in order to "log-on" to his mailbox. Note that the E-mail password must have been set to all numeric digits if it is to be the same as used directly by the voice message phone user. However, it would be possible for the voice message user to enter an alphabetic password using multiple numeric digits to represent the selected alphabetic character. The user can then send commands from his DTMF phone to create the voice message which will be stored on the server and also to address voice messages using the recipient's voice mailbox number. The voice gateway PC software uses the APIs to send the voice files to the appropriate E-mail user.

There are two methods for retrieving voice messages. In the first method, when a user views his E-mail "inbox" on his PC, some of the messages may contain voice files as a result of any of the three sending methods above. If the user opens such a message and "selects" the voice file attached, the software running on his PC recognizes that the file name is of a particular type. Thereupon, it activates a software application on the PC which sends a command (using peer-to-peer communication) to the voice gateway PC to ring the user's phone and to play the voice file selected.

In the second method, the user calls into the system from a DTMF phone directly to the voice gateway PC. As described above, the user logs-on to his mailbox via the phone. The voice gateway PC software selects the appropriate APIs to search the user's E-mail message for attached voice files. The APIs also can be used to obtain information from the user's E-mail mailbox regarding the number of messages which have voice attachments. The voice gateway PC can speak this count to the telephone user, and allows the user to play a voice file through the use of DTMF buttons on the telephone. Other standard voice messaging features such as save, erase, forward, reply, etc., are also supported.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An integrated voice and electronic mail system is described. In the following description, numerous specific details are set forth such as specific APIs, prompts, menus, software code, subroutine calls, etc., in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention applies to a computer network-based voice processing system. A network of personal computers, workstations, servers, hubs, concentrators, routers, bridges, etc., is coupled to and interfaces with a standard telephone system in order to create, send, and receive voice messages as well as electronic mail messages according to a single integrated message handling mechanism. The present invention also allows for access of messages from a remote phone. The present invention also allows for the taking of a voice message as the result of an unanswered phone call and the putting of that voice message into a designated user's E-mail mailbox.

Figure 1:
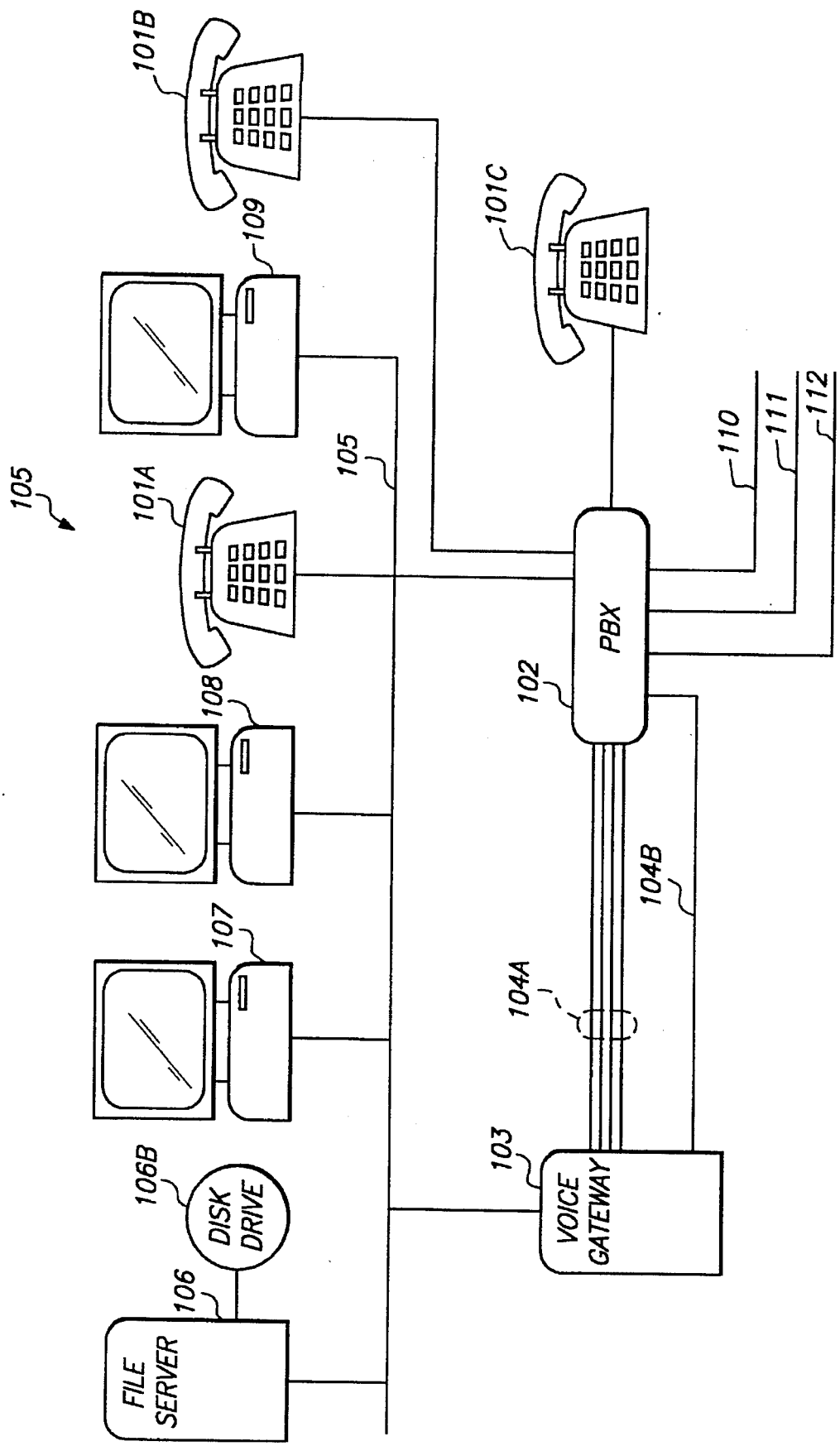
FIG. 1 shows a client-server system architecture upon which the present invention may be practiced.

Referring to FIG. 1, a client-server system architecture upon which the present invention may be practiced is shown. A number of phones 101A–C are connected to a local PBX 102. PBX 102 has several trunks 110–112, which provide transmission of analog voice signals to and from the local telephone network. Also coupled to PBX 102 is voice gateway 103. Voice gateway 103 is additionally coupled to a LAN 105 which in turn also connects a file server 106 and PC workstations 107–109. The file server provides disk (or disks) 106B for storage use by the computers on the LAN. Voice gateway 103 is a computer with voice processing and network interface cards such as those available from Dialogic™ or Rhetorex™ Corporation. The voice gateway 103 is connected via lines 104a to PBX 102. There may also be an additional connection between voice gateway 103 and PBX 102 that is the PBX Integration Link 104B for providing information when an unanswered call is forwarded to one of the lines 104A on the original called extension number.

An E-mail software package, such as Microsoft Mail™ or Lotus cc:Mail™, is installed on the PCs 107–109 and on the voice gateway PC 103. Thereby, E-mail capabilities are provided for each of the PCs on LAN 105. The file server 106 is used as the "post office" for the E-mail system. In an alternative embodiment, the present invention is applicable to wide area networks (WANs) using the E-mail software packages available to provide messaging capabilities across different LANs. That is, for workstations and PCs connected on a LAN with a file server, the two LANs are interconnected using commercially available routers, bridges, or gateways.

Software in the voice gateway 103 uses the voice processing cards connected to PBX 102 to convert analog voice signals to digital signals and sends the digital signals to file server 106 to be stored on its disk drive 106b. For playing voice messages the voice files stored on the file server disk 106B are retrieved and sent to the voice gateway 103 to be converted by the voice processing cards from digital data to analog data. Furthermore, voice cards implemented in a PC, can also send DTMF digits to dial a phone number, decode DTMF digits as commands, detect calls ringing in, answer calls (i.e., go off-hook), flash to indicate to the phone system a request for a PBX function (e.g., transfer), hang-up, etc.

The voice gateway 103 can be called directly by one of the phones 101A–C or can call one of the phones 101A–C to play or record voice messages. The voice gateway 103 can also be accessed directly by a call coming in on a trunk 110–112 being connected via lines 104a to the voice processing cards in voice gateway 103. As indicated previously, calls to phones 101 that are not answered can be forwarded by the PBX 102 to one of lines 104A and information about the extension number of the phone 101A–C is transferred via link 104B to the voice gateway.

The integration of voice messaging with an E-mail system is accomplished in part through the use of Application Program Interfaces (APIs). An API defines the sets of standard function calls to interface to the messaging system that can be invoked from an application program. Basically, an API is comprised of a group of subroutines that allows programmers to write code for using the E-mail directory, E-mail message handling mechanisms, E-mail security systems, etc., that already exist for most E-mail systems. By taking advantage of the APIs, access is gained to an E-mail system's directory and message handling mechanisms so as to integrate voice messages with the E-mail system. In other words, a developer can write code for modifying the interface for an E-mail system so as to include voice messages. In this way voice files may be managed equally as well as text files, or other attachment files.

Among the APIs are the "Messaging Application Program Interface" (MAPI) promoted by Microsoft used for interfacing to Microsoft Mail™ and other MAPI compliant e-mail products; and "Vendor Independent Messaging" (VIM) promoted by Lotus and others for interfacing to Lotus cc:Mail™ and other VIM compliant e-mail products. Table 1 below lists the MAPI and VIM APIs used for implementing the voice messaging functions previously described. There are now and may be in the future other E-mail API's that one of ordinary skill could use to produce the invention.

These are given only as methods for two embodiments of the present invention. In the following description, digitized voice files are identified by the four character extension .vox.

TABLE 1

| What's happening | MAPI call | VIM API call |
|---|---|---|
| *PC/Workstation Software Operations* | | |
| Record a message and then press the mail button | MAPISendDocuments | SMISendMail |
| Listen to voice messages found in the user's mail folder/In Tray Inbox | No special API function required - autoloads special application on the K based on association to .VOX extension | No special API function required - autoloads special application on the K based on association to .VOX extension |
| *General Housekeeping* | | |
| Administration | | |
| Assign voicemail box numbers and passwords; also default telephone extensions required for 'Connect to Sender'. | A template that has two additional fields 'Voice mailbox Number' and 'Default Telephone Extension' is defined. The standard Mail address book form has two 'Phone Number' fields. The 'Phone number #2 is used as the Voice mailbox number, and Phone number #1 is the extension number. | Use the cc:Mail Admin (DOS) program to create aliases for existing users. These aliases contain the mailbox number as the name, the telephone extension in the comments field and user name in the address field. |
| Voice Gateway User Table Creation. The User Table is created periodically and is updated every time the Voice Gateway is restarted. | A text file containing the MAPI address book is created using the MS-Mail template.exe utility, which is read into memory. This contains the required information about the users. | VIMGetDefaultSessionlnfo VIMOpenSession VIMOpenAddressBook VIMEnumerateAddressBookEntries VIMCloseAddressBook VIMCloseSession |
| General Session Management | InitMAPI MAPILogon MAPILogoff DeInitMAPI | VIMInitialize VIMOpenSession VIMCloseSession VIMTerminate |
| *PBX Integrated Call Answering* | | |
| Call forwards to Voice Gateway with called extension number information | Look up the extension number in the user table created at start-up to get E-mail Mailbox number. | Look up the extension number in the user table created at start-up to get E-mail Mailbox number. |
| External caller records message for the called extension user. Need to send voice file to the users E-mail address. | MAPILogon MAPISendMail MAPILogoff | VIMGetDefaultSessionInfo VIMOpenSession VIMCreateMessage VIMSetMessageHeader VIMSetMessageRecipient VIMSendMessage VIMCloseSession |
| *User Calls In to Listen to Messages* | | |
| User calls Voice Gateway to | Check name from user table. | Check name from user table. Check password |

TABLE 1-continued

| What's happening | MAPI call | VIM API call |
|---|---|---|
| check voice messages. User enters Voice mailbox number and password. | Check password using MAPILogon | using VIMOpenSession |
| Count and access voice files. | MAPIFindNext MAPIReadMail (look for vox files) MAPIFreeBuffer MAPILogoff | VIMOpenMessageContainer VIMEnumerateMessages VIMOpenMessage VIMEnumerateMessageItems (look for vox files) VIMGetMessageItem VIMCloseMessage VIMCloseMessageContainer VIMCloseSession |
| Tell User how many voice messages. | All.vox files found above have been extracted from their messages and their filenames are sent to the Voice gateway PC for playing back | All.vox files found above have been extracted from their messages and their filenames are sent to the Voice gateway PC for playing back. |
| Listen to messages | MAPIReadMail (without the MAPI_PEEK flag) MAPIFreeBuffer | VIMOpenMessageContainer VIMMarkMessageAsRead VIMCloseMessageContainer |

Message Playback Options

Options during

Message Playback

| | | |
|---|---|---|
| Connect to message sender | The Voice Server has received the telephone extension of the sender with the other information of the .vox file | The Voice Server has received the telephone extension of the sender with the other information of the vox f e |
| Reply to sender | Combinations of above | Combinations of above |
| Forward to another user | Combinations of above | Combinations of above |
| Save | MAPI SaveMail is used to Save a mail message | VIMMarkMessageAs Read |
| Record a new prompt | No special API functions required | No special API functions required |
| Delete | MAPIReadMail MAPIDeleteMail MAPIFreeBuffer | VIMOpenMessageContainer VIMRemoveMessage VIMCloseMessageContainer |
| Cycle forwards and backwards through messages | No Special functions required | No special functions required |

FIGS. 2–16 are flowcharts illustrating the steps for implementing the present invention. The following conventions are used in these flowcharts: a rectangular box indicates information entered by an outside caller; a diamond indicates a conditional branching; an oval indicates internal voice message system operation or a function call; and a rectangle having rounded corners indicates a message being played to the caller. Phrases in quotation marks are typical of the system message played to the caller at this point. In particular, the flowcharts of FIGS. 4–10 are directed towards the steps of implementing the present invention on MAPI E-mail systems, while the flowcharts depicted in FIGS. 11–15 are directed towards VIM E-mail systems.

As indicated in Table 1, under "General Housekeeping," there are some functions performed for setting up the E-mail system user directory to handle voice messages and also by the voice gateway PC to create special tables to facilitate certain feature implementations. In order to use the E-mail directory, the user voice mailbox and extension number need to be assigned and associated with their E-mail identification. In many cases, the extension number and voice mailbox may be the same, and thus, only one entry is needed. In either case, the voice gateway PC scans the E-mail directory and builds a table (herein called the "User Table") which can be searched using the voice mailbox or extension number to determine an E-mail identification called E-mail name. This User Table is referred to in the flow charts.

Figure 2:
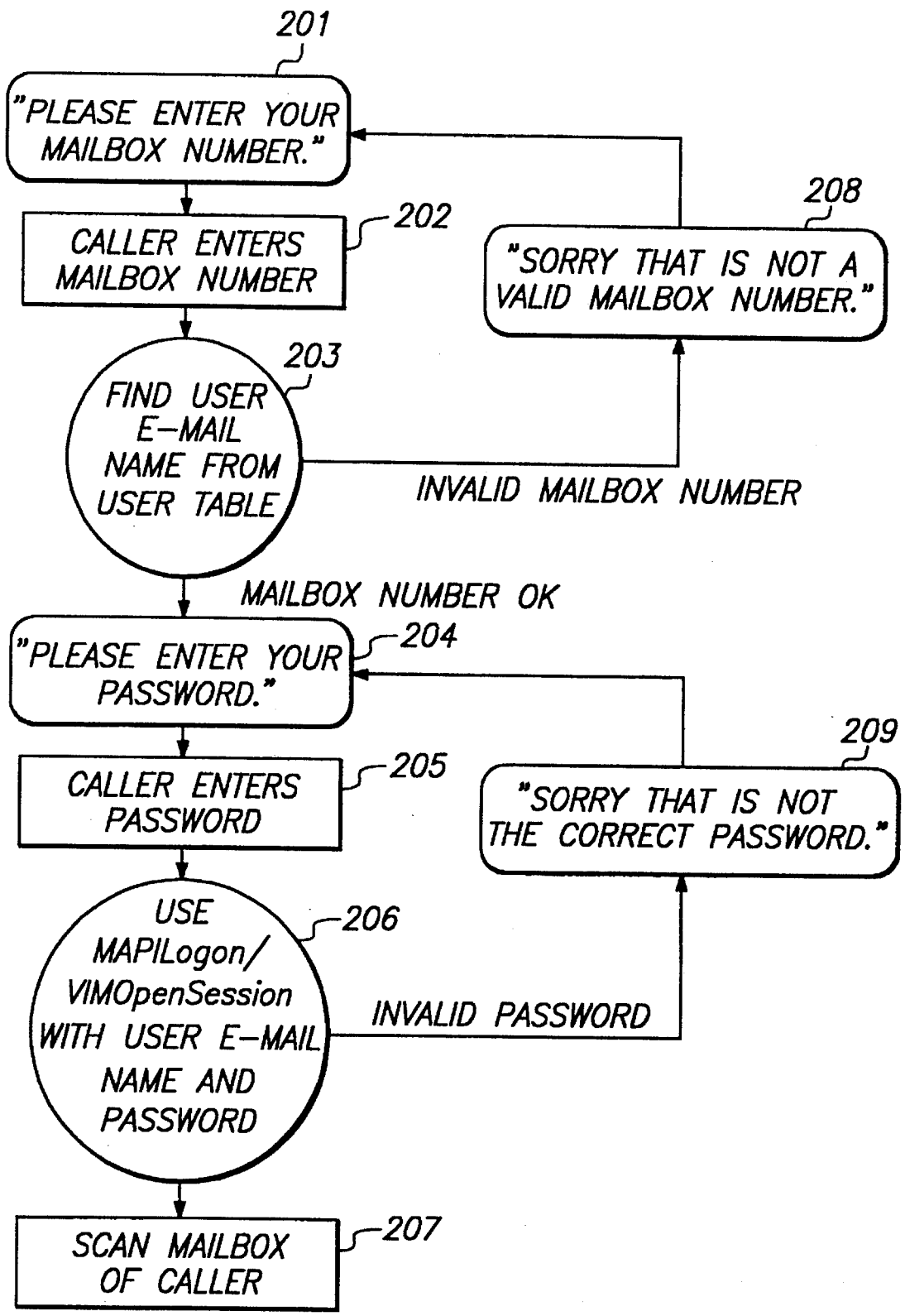
FIG. 2 shows a flowchart describing the steps for a caller logging into his or her mailbox using an E-mail system.

Referring now to FIG. 2, a flowchart describing the steps for a caller logging into his or her mailbox is shown. Initially, the computer prompts the caller to enter his or her mailbox number, step 201. Prompts are pre-named voice files that are stored either on the file server or voice gateway and are read off disk storage and sent to the voice processing cards to be converted from digital data to analog data to be played. Thereupon, the caller enters his or her assigned voice mailbox number, step 202. For this and other functions, the user "enters" numbers using a standard DTMF phone key pad. The tones received by the voice processing cards in the gateway PC are converted to their corresponding digit * or # representations and made available to the voice gateway PC for processing. The voice gateway PC searches for the User's name from the User Table stored in memory, step 203. If there is no match, a voice message such as "Sorry, that is not a valid mailbox number," will be played to the caller, step 208.

Otherwise, if the mailbox number is valid, the computer system prompts the user to enter his or her password, step 204. In response, the caller enters the password, step 205. The user name and password is sent to a subroutine (e.g., MAPILogon or VIMOpenSession) to determine whether that password correctly matches with the user name, step 206. If the password is invalid, the computer sends a voice message such as "Sorry, that is not the correct password," to the caller, step 209. The computer reprompts the caller to enter his password, step 204. If a valid password has been entered, the mailbox of the caller is scanned, step 207. The scanning step is described in detail below in reference to FIG. 4 for MAPI applications and to FIG. 11 for VIM applications.

Figure 3:
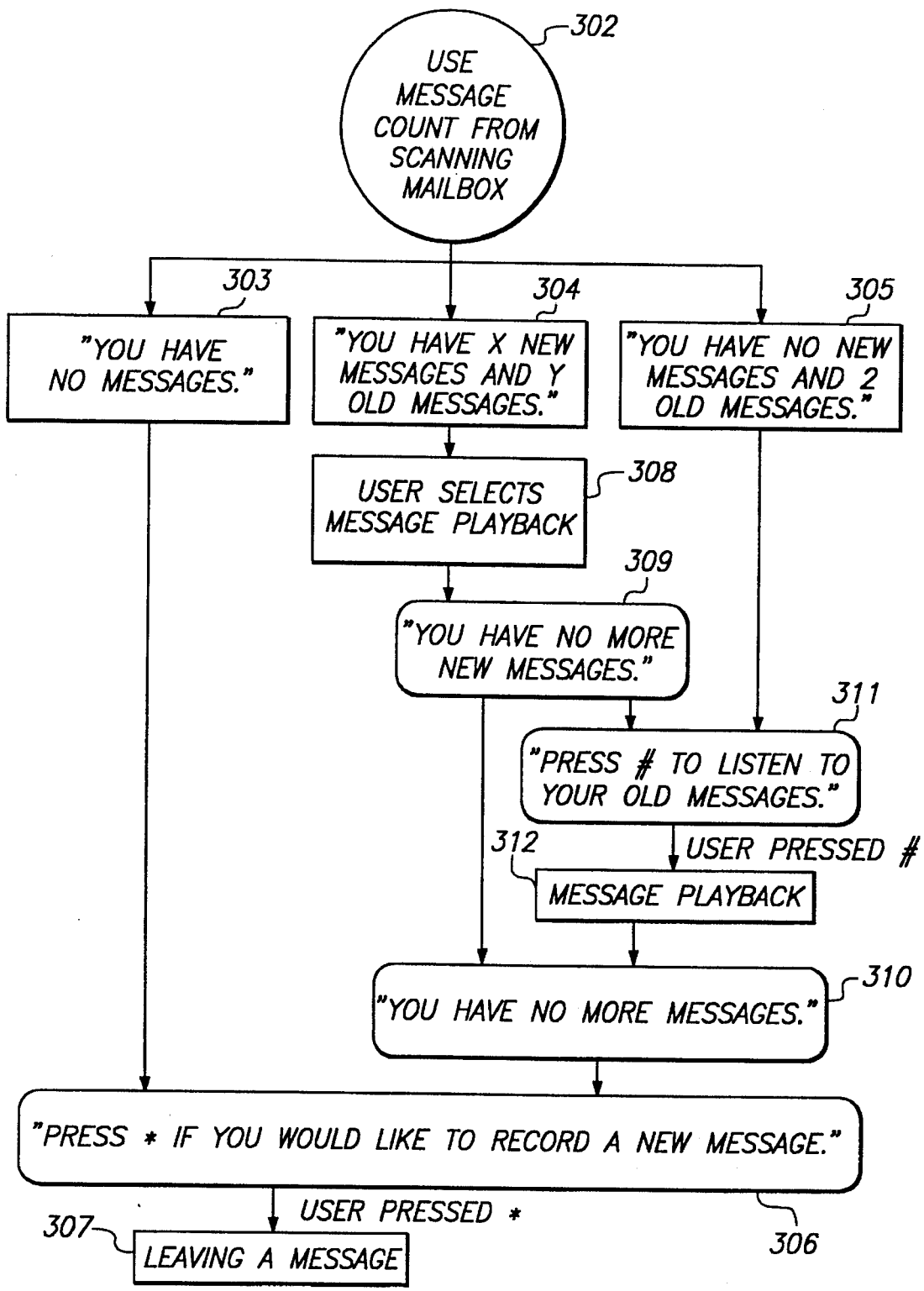
FIG. 3 shows a flowchart describing the steps for providing a caller with a message summary for review of his or her messages.

FIG. 3 shows a flowchart describing the next steps for providing a caller with a message summary for review of his or her messages. The message count is used to determine the prompt about mailbox message information, step 302. Depending on the message count, there can be three outcomes. If there are no messages, the caller is so informed, step 303. The computer system then prompts the user to press "*" to record a new message, step 306. A new message is recorded if the user proceeds to press "*" and leaves a message, step 307. The steps for sending a message is described in detail below in reference to FIG. 6 for MAPI applications and to FIG. 10 for VIM applications. If there are new messages, the computer system will inform the user of the number of new messages as well as the number of old messages, step 304. The messages are then played back, step 308. The steps for message playback of new messages is described in detail below in reference to FIG. 5 for MAPI applications and to FIG. 12 for VIM applications. Once message playback is completed, the computer system indicates that there are no more new messages, step 309. At that point, the user can press "#" to listen to his or her old messages, step 311. If the user does press the "#" symbol, the old messages are played back, step 312. The steps for message playback of old messages is described in detail below in reference to FIG. 6 for MAPI applications and FIG. 12 for VIM with step 1204 modified to reverse the path for "yes" and "no".

If there are no old messages, the computer system so informs the caller, step 310. If there are no new messages, the computer system informs the caller of this status as well as the number of old messages, step 305. If there are no old messages either, then the computer system indicates that the caller has no more messages, step 310. Otherwise, the user can press the "#" symbol to listen to his or her old messages, step 311. Pressing the "#" symbol causes the old messages to be played back, step 312.

Figure 4:
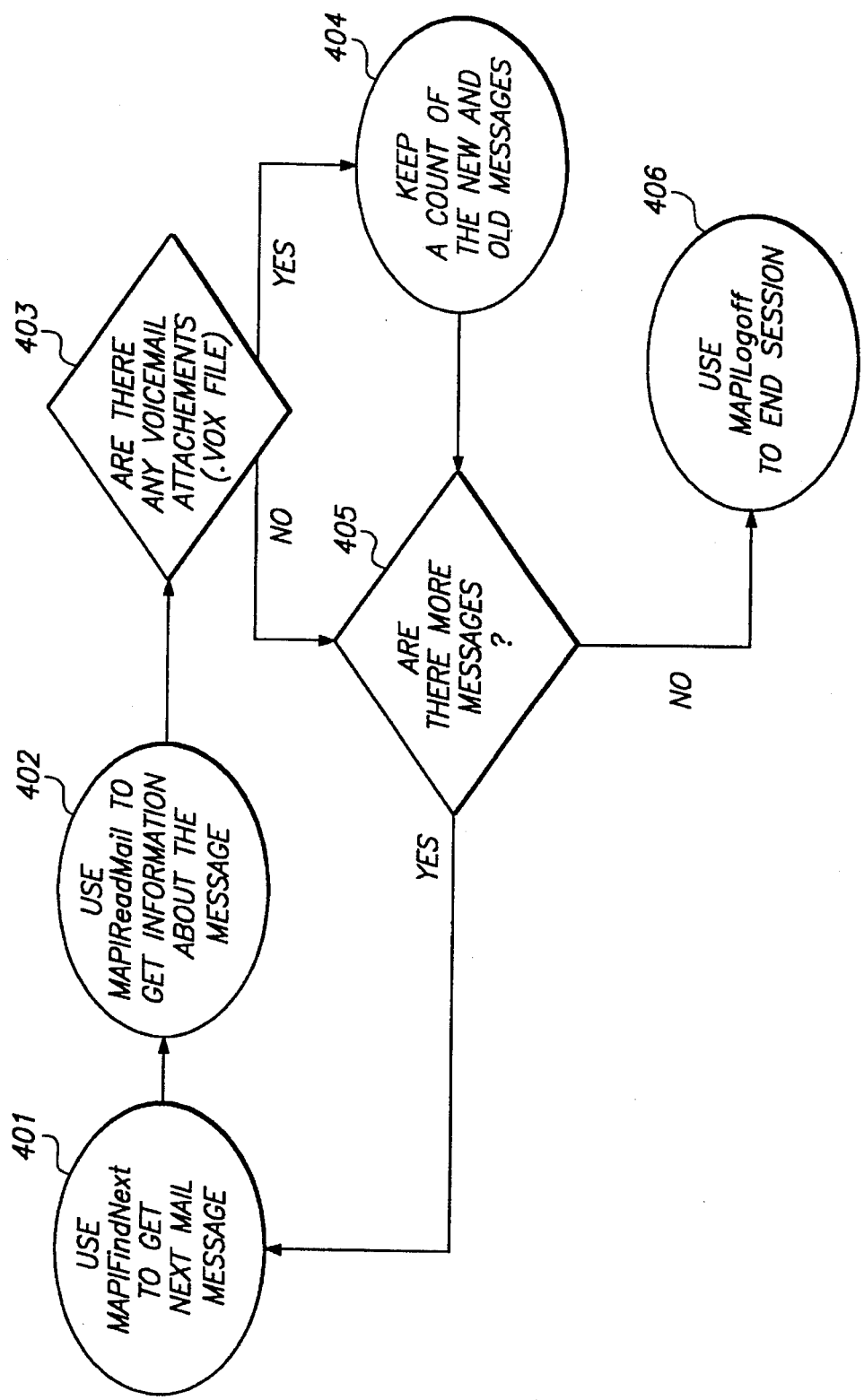
FIG. 4 is a flowchart showing the steps for scanning the mailbox of the caller for a voicemail system which is integrated with MAPI E-mail systems.

FIG. 4 is a flowchart showing the steps for scanning the mailbox of the caller for a voicemail system which is integrated with a MAPI E-mail system. In step 401, the MAPIFindNext subroutine is used to get the next mail message. Next, the MAPIReadMail subroutine is used to get information about the message, step 402. A determination is made as to whether there are any voicemail attachments, step 403. If so, a count is incremented of the new and old messages, step 404. The algorithm proceeds to step 405. If there are no voicemail attachments, a determination is made as to whether there are any more messages, step 405. If there are more messages, step 401 is repeated. Otherwise, the MAPILogoff subroutine is executed to end the session, step 406.

Figure 5:
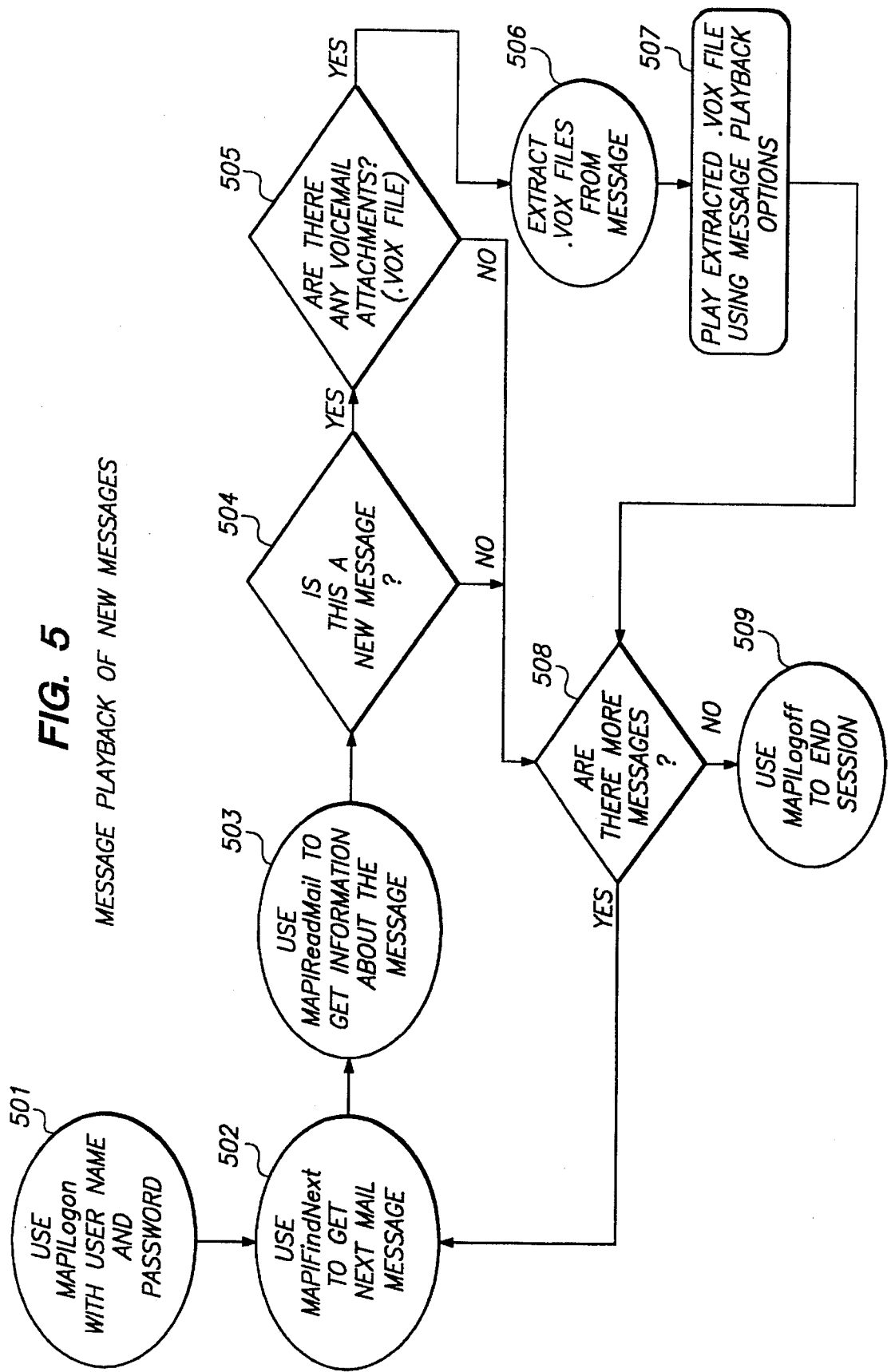
FIG. 5 is a flowchart describing the steps for message playback of new messages of a voicemail system integrated with MAPI E-mail systems.

FIG. 5 is a flowchart describing the steps for message playback of new messages of a voicemail system integrated with MAPI E-mail systems. In 501, the user name and password is provided to the MAPILogon subroutine. The MAPIFindNext subroutine is used to get the next mail message, step 502. Next, the MAPIReadMail subroutine is used to get the information about that message, step 503. A determination is made as to whether this is a new message, step 504. If so, a determination is then made as to whether there are any voicemail attachments, step 505. If it is determined that there are voicemail attachments, the .vox files are extracted from the message, step 506.

The extracted .vox file is played by using the message playback options, step 507. If it is determined in steps 504 and 505 that either this is not a new message or that there are no voicemail attachments, step 508 is performed immediately. If it is determined in step 508 that there are no more messages, the MAPILogoff subroutine is used to end the session, step 509. Otherwise, step 502 is repeated to get the next mail message. Note that this flowchart shows message playback for new messages.

Figure 6:
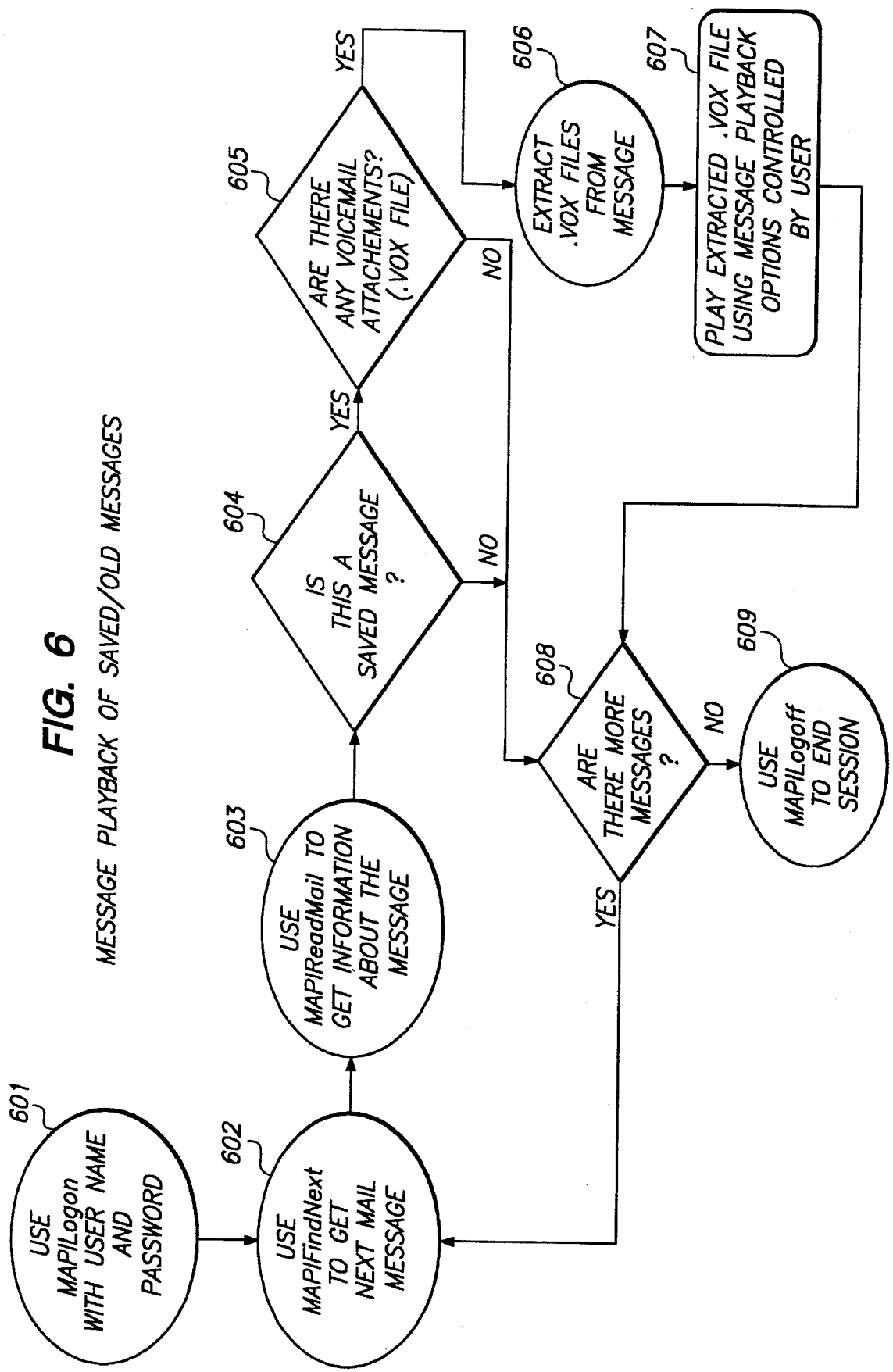
FIG. 6 is a flowchart describing the steps for message playback of saved/old messages of a voicemail system integrated with MAPI E-mail systems.

FIG. 6 is a flowchart showing the steps for playback of saved or old messages. In step 601, the user name and password is provided to the MAPILogon subroutine. The MAPIFindNext subroutine is used to get the next mail message, step 602. Next, the MAPIReadMail subroutine is used to get the information about that message, step 603. A determination is made as to whether this is a saved or old message, step 604. If so, a determination is then made as to whether there are any voicemail attachments, step 605. If it is determined that there are voicemail attachments, the .vox files are extracted from the message, step 606.

The extracted .vox file is played by using the message playback options, step 607. If it is determined in steps 604 and 605 that either this is not a saved message or that there are no voicemail attachments, step 608 is performed immediately. If it is determined in step 608 that there are no more messages, the MAPILogoff subroutine is used to end the session, step 609. Otherwise, step 512 is repeated to get the next mail message.

Figure 7:
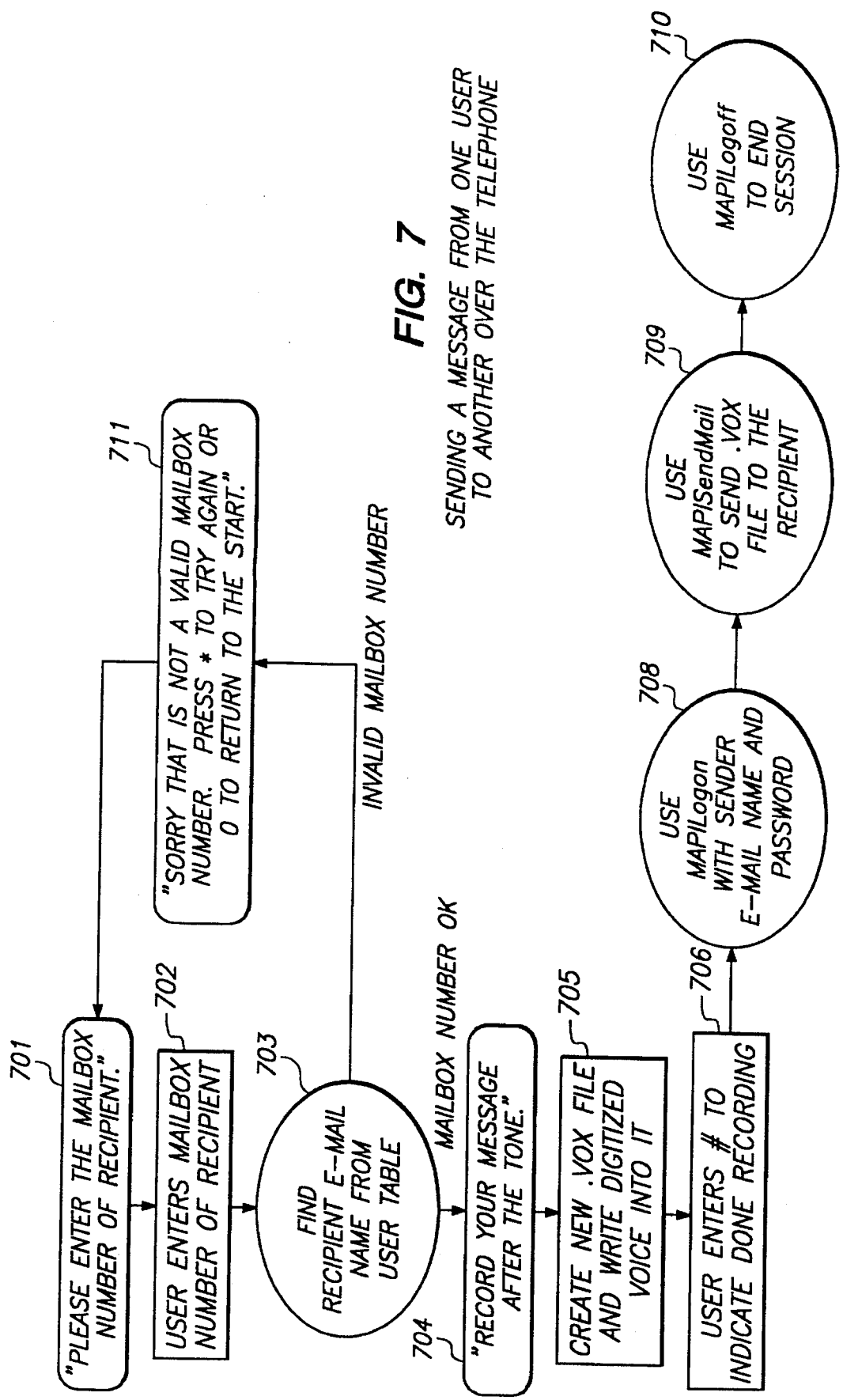
FIG. 7 is a flowchart describing the steps for sending a message from one user to another over the telephone with MAPI E-mail systems.

FIG. 7 is a flowchart describing the steps for voice message users to send a message to another user over the phone. In step 701, the user is prompted to enter the voice mailbox number of the recipient. The user then enters the voice mailbox number of the recipient, step 702. The computer system locates the recipient E-mail name from the stored user table, step 703. If it is determined that the mailbox number is invalid, a voice message such as "Sorry, this is not a valid mailbox number. Press * to try again or 0 to return to the start," is sent to the caller, step 711. If it is determined that the mailbox number is valid the system plays a prerecorded message such as "Record your message after the tone," step 704.

A new file is created on the file server with a file name that is uniquely created and has ".vox" as its last 4 characters and the system transfers the digitized voice signal to this file, step 705. The user indicates he is finished recording by entering a #, step 706. In step 708, the call to MAPILogon is used with the sending user's E-mail name and password (so he will appear as the originator of the message). In step 709, the MAPISendMail subroutine is used to send the created voice file with .vox in its file name attached to an E-mail message to the recipient using the E-mail name previously determined from the mailbox number. A MAPI-Logoff subroutine is used to end the session, step 710.

Figure 8:
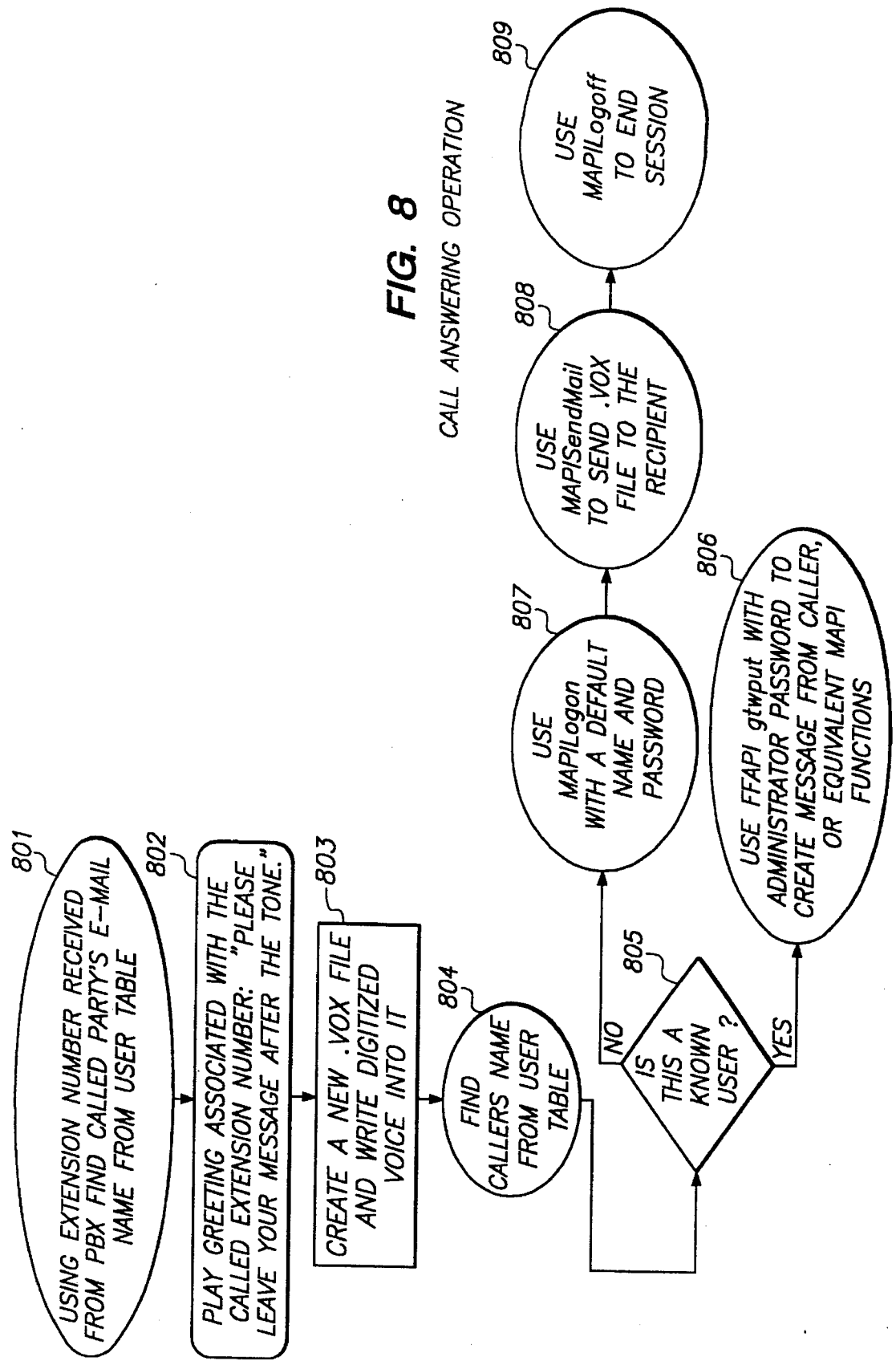
FIG. 8 is a flowchart describing the steps for a call answering operation with MAPI E-mail systems.

The flowchart of FIG. 8 shows the steps for a call answering voice message operation using MAPI. The called party's extension is forwarded to the voice message system ports, and the PBX provides integration information along with the call, including giving the called party's extension number. In step 801, the extension number received from the PBX is used to find the called party's E-mail name from the User Table. In step 802, the system plays a personal greeting previously recorded by the user of the called extension (or a default message if none is recorded—such as "Extension xxxx did not answer"). Step 803 shows the creation of a new file name with a .vox extension (to indicate it is a voice file) and the writing of digitized voice data into the file. Recording is terminated when the user hangs-up or on the detection of silence, special tones, or a timeout and control proceeds to step 804.

If the forwarded call is from another extension on the same PBX, some PBX integrations also give the calling party's extension number as well as that of the called party. Step 804 checks to see if the caller extension has an entry in the User Table. In Step 805, the decision is made to go to step 806 if there is an entry and it is a known user or to step 807 if it is not. In step 806, The FFAPI gtwput subroutine is used with the administrator password to create message from Caller or equivalent MAPI functions. In step 807, a default name (for example, "External") and password is used as the originator of the message. Then MAPISendMail is used to send the .vox file, step 808, and MAPILogoff is used to end the session, step 809.

Figure 9:
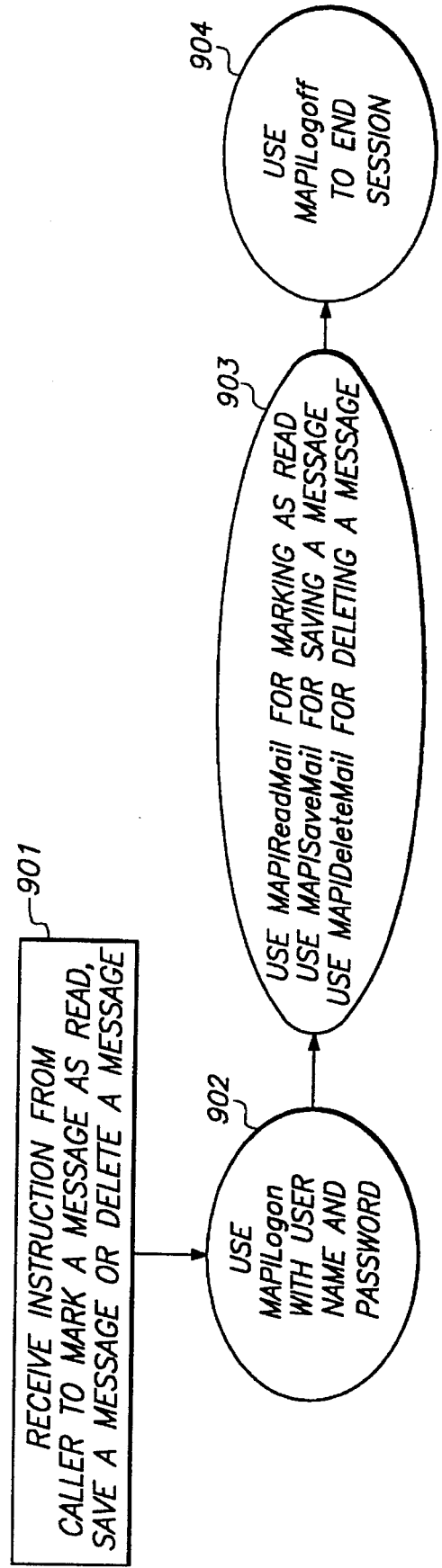
FIG. 9 is a flowchart showing the steps for saving and deleting messages and marking messages as read with MAPI E-mail systems.

FIG. 9 is a flowchart showing the steps for marking as read, saving, and deleting messages. Initially, the caller instructs the computer system to either mark a message as read, save a message, or delete a message, step 901. A call is made to the MAPILogon subroutine with the user name and password, step 902. A call is made to one of three different subroutines depending upon the caller's instruction, step 903. A call is made to the MAPIReadMail subroutine for marking the messages as read. The MAPISaveMail subroutine is utilized for saving a message. The MAPIDeleteMail subroutine is used for deleting a message. MAPILogoff is used to end the session, step 904.

Figure 10:
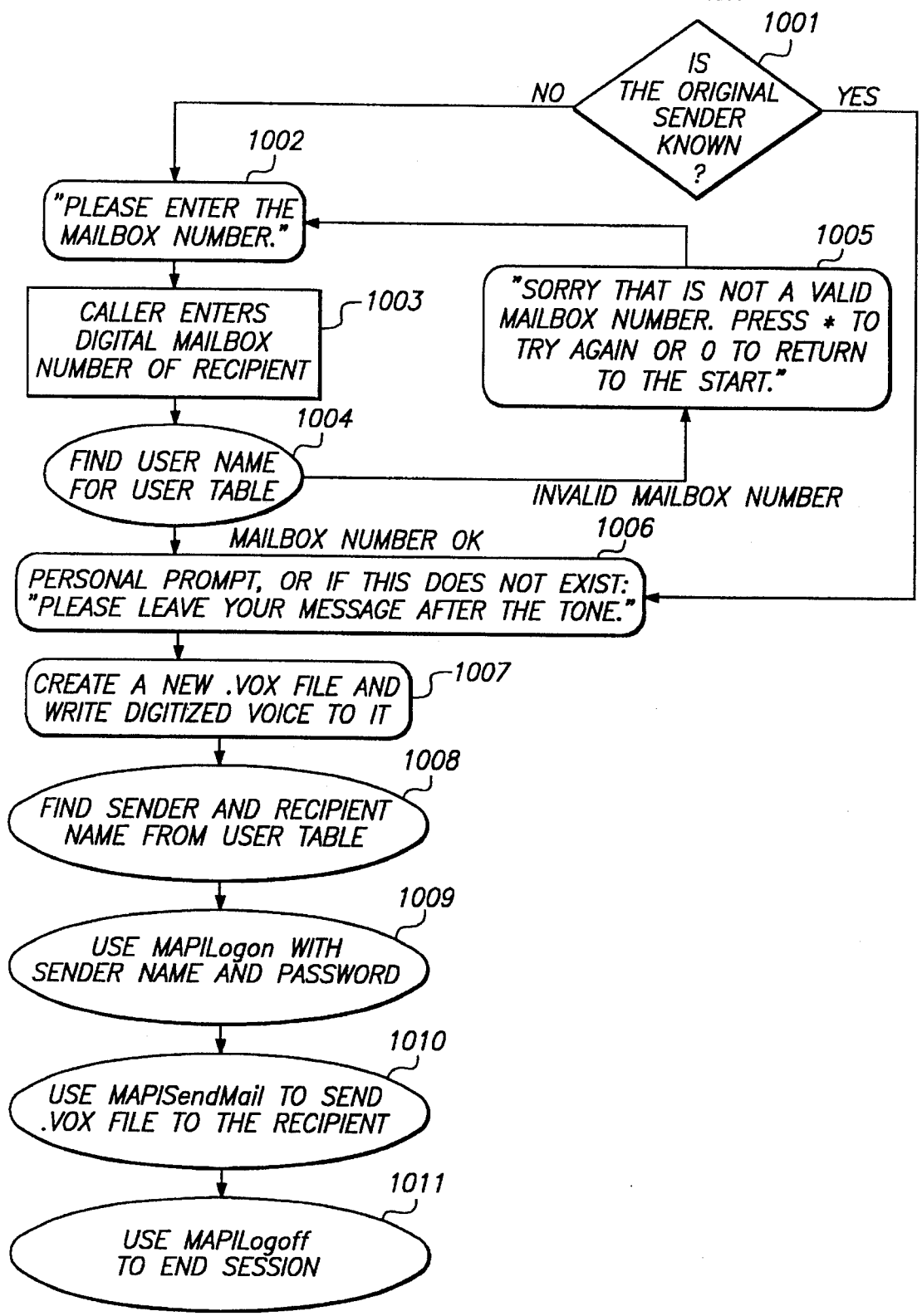
FIG. 10 is a flowchart showing the steps for replying to a message during message playback with MAPI E-mail systems.

FIG. 10 is a flowchart showing the steps for replying to a message during message playback for MAPI applications. Initially, a determination is made as to whether the original sender is known, step 1001. If so, the process jumps to step 1006. Otherwise, step 1002 prompts the user is prompted to "Please enter the Mailbox Number." In step 1003, the caller enters the voice mailbox number of the recipient. The user name is then located from the user table, step 1004. If it is an invalid mailbox number, step 1005 informs the user, "Sorry that is not a valid Mailbox Number. Press * to try again or 0 to return to the start." And step 1002 is repeated. If the mailbox number is valid, step 1006 gives a personal prompt. If this does not exist, the computer transmits, "Please leave your message after the tone." In step 1007, a new .vox file is created, and the digitized voice is written to it. The sender's and recipient's names are located from the user table, step 1008. The MAPILogon subroutine is used with the sender name and password, step 1009. The .vox file is then sent to the recipient by using the MAPISendMail subroutine, step 1010. MAPILogoff is used to end the session, step 1011.

Figure 11:
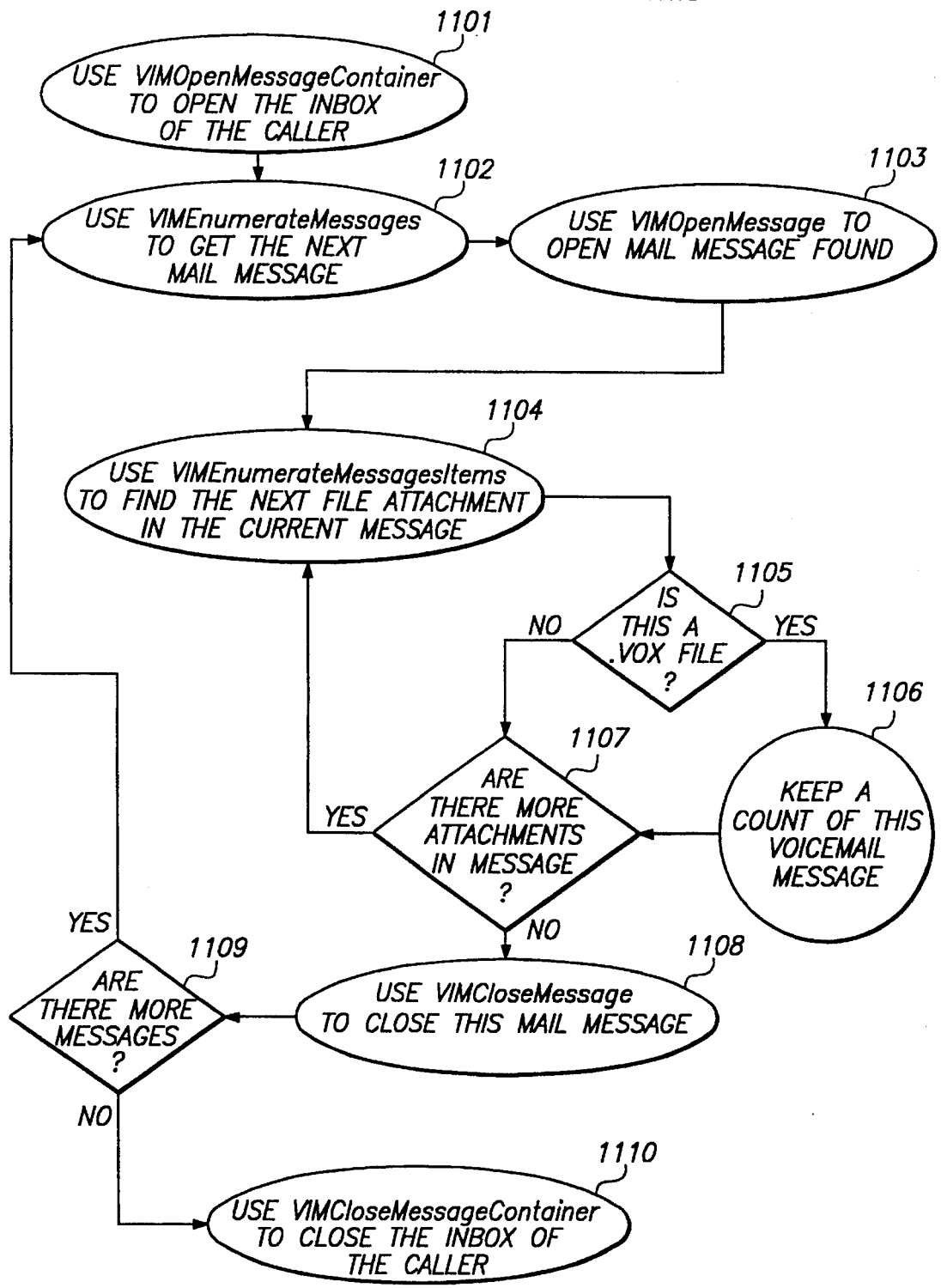
FIG. 11 is a flowchart showing the steps for scanning the mailbox of the caller using the VIM (Vender Independent Messaging) APIs supported by Lotus cc:Mail.

FIG. 11 is a flowchart showing the steps for scanning the mailbox of the caller to get the count of new and saved messages in E-mail systems using VIM. Initially, the VIMOpenMessageContainer subroutine is used to open the Inbox of the caller, step 1101. The VIMEnumerateMessage subroutine is used to retrieve the caller's next mail message, step 1102. Given that a mail message has been found, VIMOpenMessage subroutine is used to open that mail message, step 1103. The VIMEnumerateMessageItems subroutine is used to find the next file attachment in that message, step 1104. A determination is made as to whether the attachment is a .vox file, step 1105. If so, a count is kept of this voicemail message, step 1106. Following step 1106 or if it is determined that the attachment is not a .vox file, a determination is made as to whether there are any more attachments in that message, step 1107. If there are more attachments, step 1104 is repeated. Otherwise, the VIMCloseMessage subroutine is used to close this mail message, step 1108. A determination is made as to whether there are any more messages, step 1109. If there are more messages, then step 1102 is repeated. Otherwise, the VIMCloseMessageContainer subroutine is used to close the Inbox of the caller, step 1110.

Figure 12:
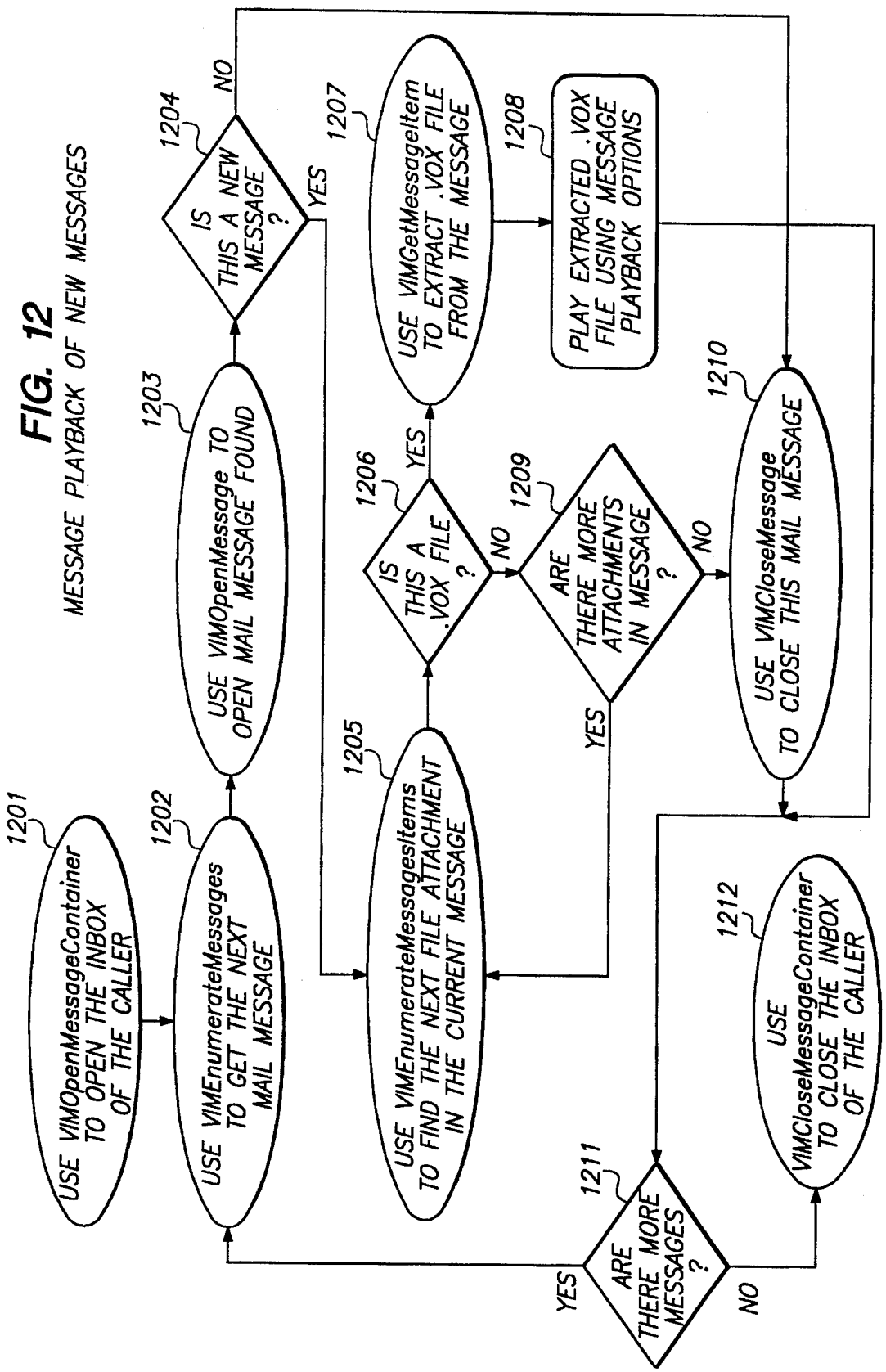
FIG. 12 is a flowchart showing the steps for message playback of new messages with a VIM type E-mail system.

FIG. 12 is a flowchart showing the steps for the playback of new messages using VIM. Initially, the VIMOpenMessageContainer is used to open the Inbox of the caller, step 1201. The VIMEnumerateMessages subroutine is used to get the next mail message, step 1202. Once the next mail message has been found, it is opened by implementing the VIMOpenMessage subroutine, step 1203. A determination is made as to whether this is a new message, step 1204. If it is determined that this is a new message, the VIMEnumerateMessagesItems subroutine is used to find the next file attachment in the current message, step 1205.

A determination is made as to whether the attachment is a .vox file, step 1206. If so, the VIMGetMessageItem subroutine is used to extract the .vox file from the message, step 1207. The extracted .vox file is played back by using the message playback options, step 1208. If it is determined in step 1206 that the attachment is not a .vox file, then steps 1207 and 1208 are skipped and the determination of step 1209 is performed. If there are more attachments in the message, step 1205 is repeated. Otherwise, the VIMCloseMessage subroutine is used to close this mail message, step 1210. In step 1211, a determination is made as to whether there are any more messages. If so, step 1202 is repeated. Otherwise, the VIMCloseMessageContainer subroutine is used to close the Inbox of the caller, step 12 12. Not shown for VIM is the play back of saved messages. As for MAPI shown in FIG. 5b, it simply changes step 1204 in FIG. 12 to look for "old/saved" messages instead of new.

Figure 13:
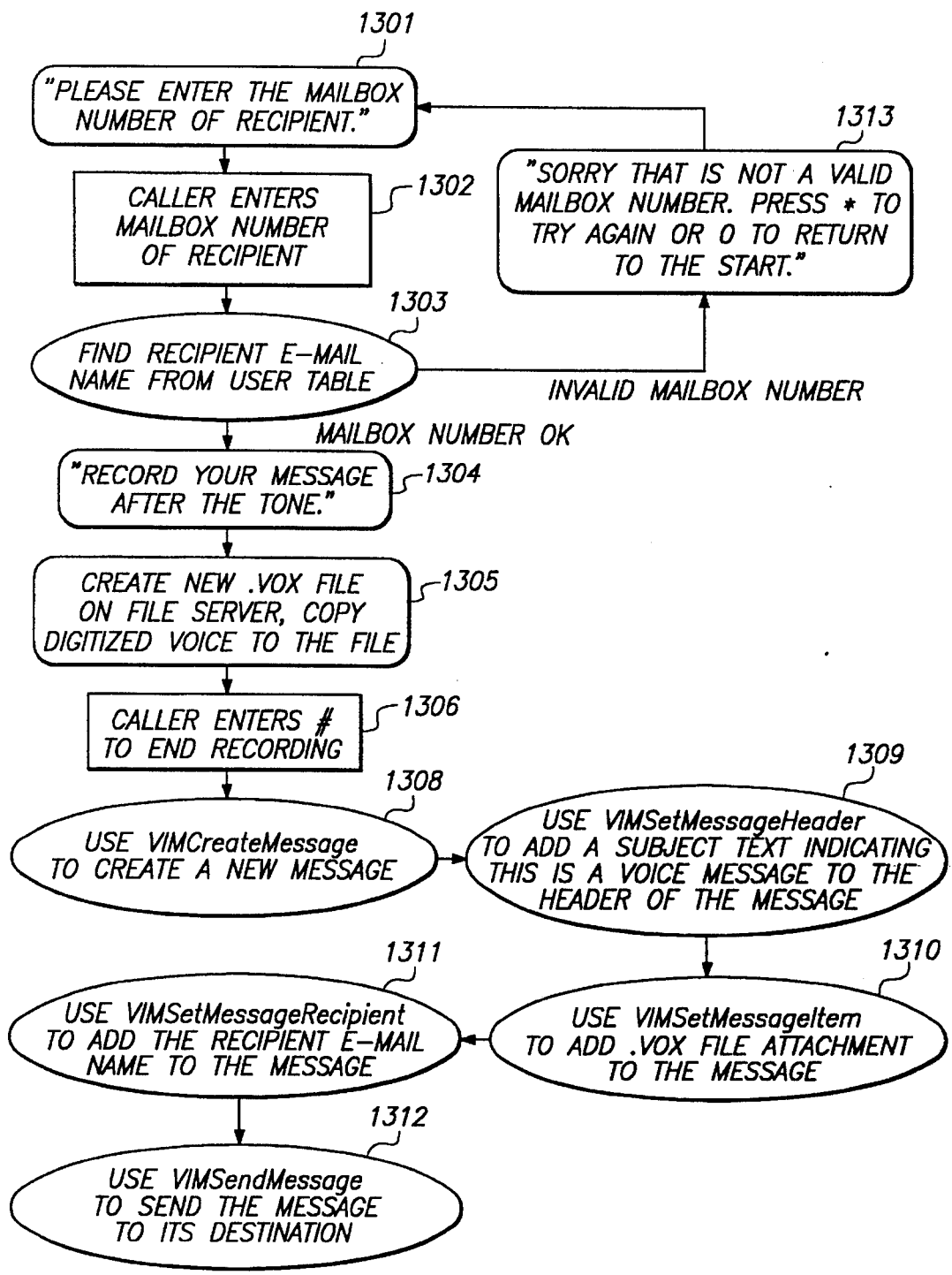
FIG. 13 is a flowchart showing the steps for sending a message from one user to another over the telephone with a VIM type E-mail system.

FIG. 13 is a flowchart showing the steps for sending a message from one user to another over the phone in E-mail systems using VIM. The caller is prompted to "Please enter the mailbox number", step 1301. The caller enters the voice mailbox number of the recipient, step 1302. The computer system looks up the recipient E-mail name from the stored user table, step 1303. If the mailbox number is invalid, the caller is sent a message such as "Sorry, that is not a valid mailbox number. Press * to try again or 0 to return to the start", step 1313. If the mailbox number is valid, a message such as "Record your message after the tone," is played, step 1304.

A new file is created on the file server with a file name that is uniquely created which has ".vox" as its last 4 characters, and the system transfers the digitized voice signal from the user to this file, step 1305. The user indicates he is finished recording by entering a #, step 1306. Next, the VIMCreateMessage subroutine is used to create a new message, step 1308. Thereupon, step 1308 is performed. In step 1309, the VIMSetMessageHeader subroutine is used to add information to the header of the message. The VIMSetMessageItem subroutine is used to add .VOX file attachments to the message, step 1310. The VIMSetMessageRecipient subroutine is used to add the recipient E-mail name to the message, step 1311. Finally, the VIMSendMessage subroutine is used to send the message to its destination, step 1312.

Figure 14:
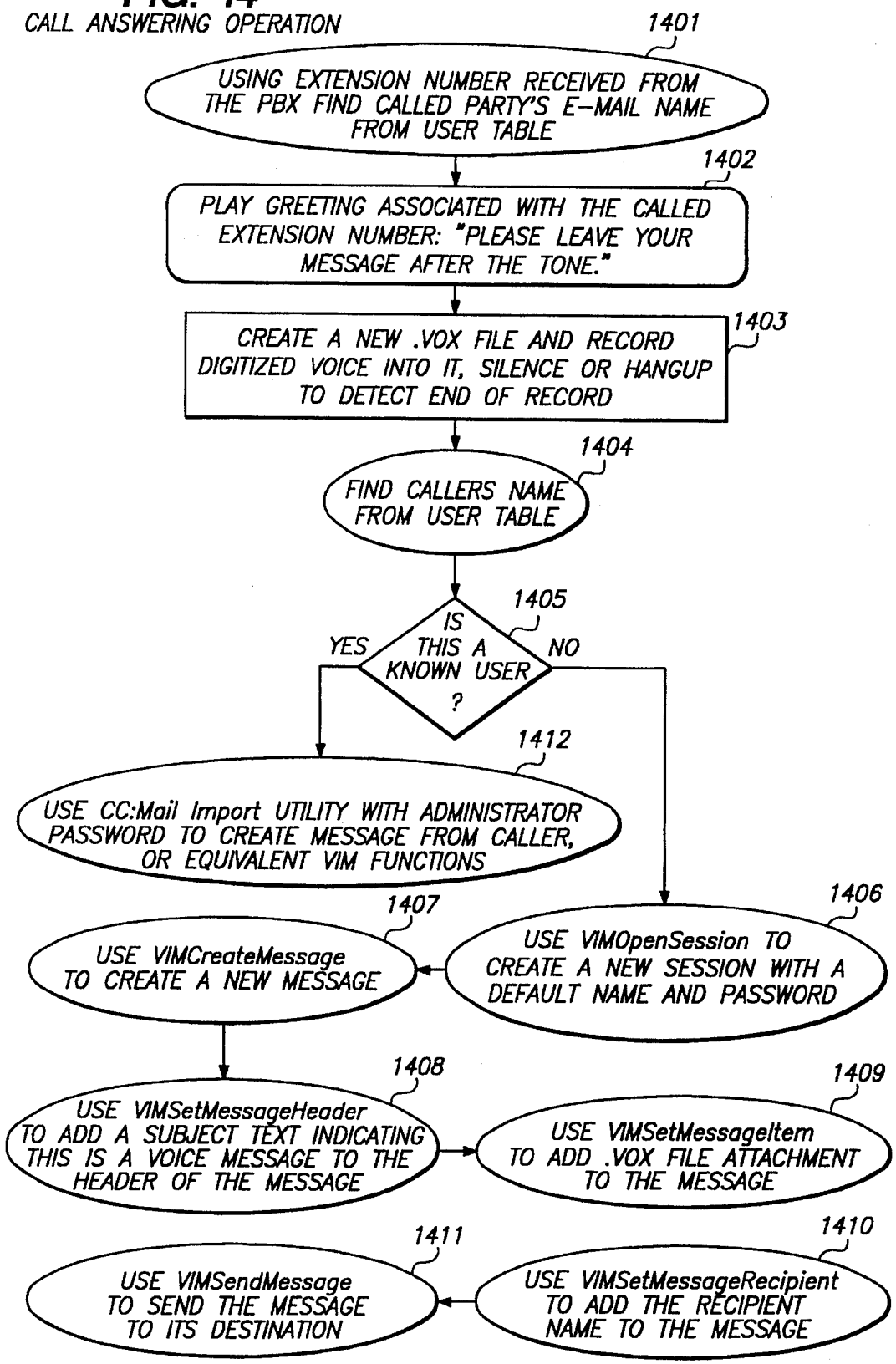
FIG. 14 is a flowchart showing the steps for a call answering operation with a VIM type E-mail system.

The flowchart of FIG. 14 shows the steps for a call answering voice message operation using VIM. The called party's extension is forwarded to the voice message system ports and the PBX provides integration information along with the call giving the called party's extension number. Starting with step 1401, the extension number received from the PBX is used to find the called party's E-mail name from the User Table. In step 1402, the system plays a personal greeting previously recorded by the user of the called extension (or a default message if none is recorded— such as "Extension xxxx did not answer"). Step 1403 shows the creation of a new file name with a .vox extension (to indicate it is a voice file) and the writing of digitized voice data into the file. Recording is terminated when the user hangs-up or on the detection of silence, special tones, or a timeout and control proceeds to step 1404.

If the forwarded call is from another extension on the same PBX, some PBX integrations also give the calling party's extension number as well as the called party's extension. Step 1404 checks to see if the caller extension has an entry in the User Table. In Step 1405, the decision is made to go to step 1412 if there is an entry and it is a known user, or to 1406 if it is not. In step 1412, the cc:Mail Import utility is used with the administrator password to create message from Caller or equivalent VIM functions. In step 1406, VIMOpenSession is used to create a new session using a default name and password as described previously for MAPI. The flow then goes to step 1407 to use VIMCreateMessage to create a new E-mail message. VIMSetMessageHeader is used to add information to the header of the message, step 1408. VIMSetMessageItem is then used to add the .vox voice file to the message, step 1409. In the next step of 1410, VIMSetMessageRecipient is used to add the recipient's E-mail name (i.e., address) to the message. In step 1411, VIMSendMessage is used to send the message to the recipients mailbox.

Figure 15:
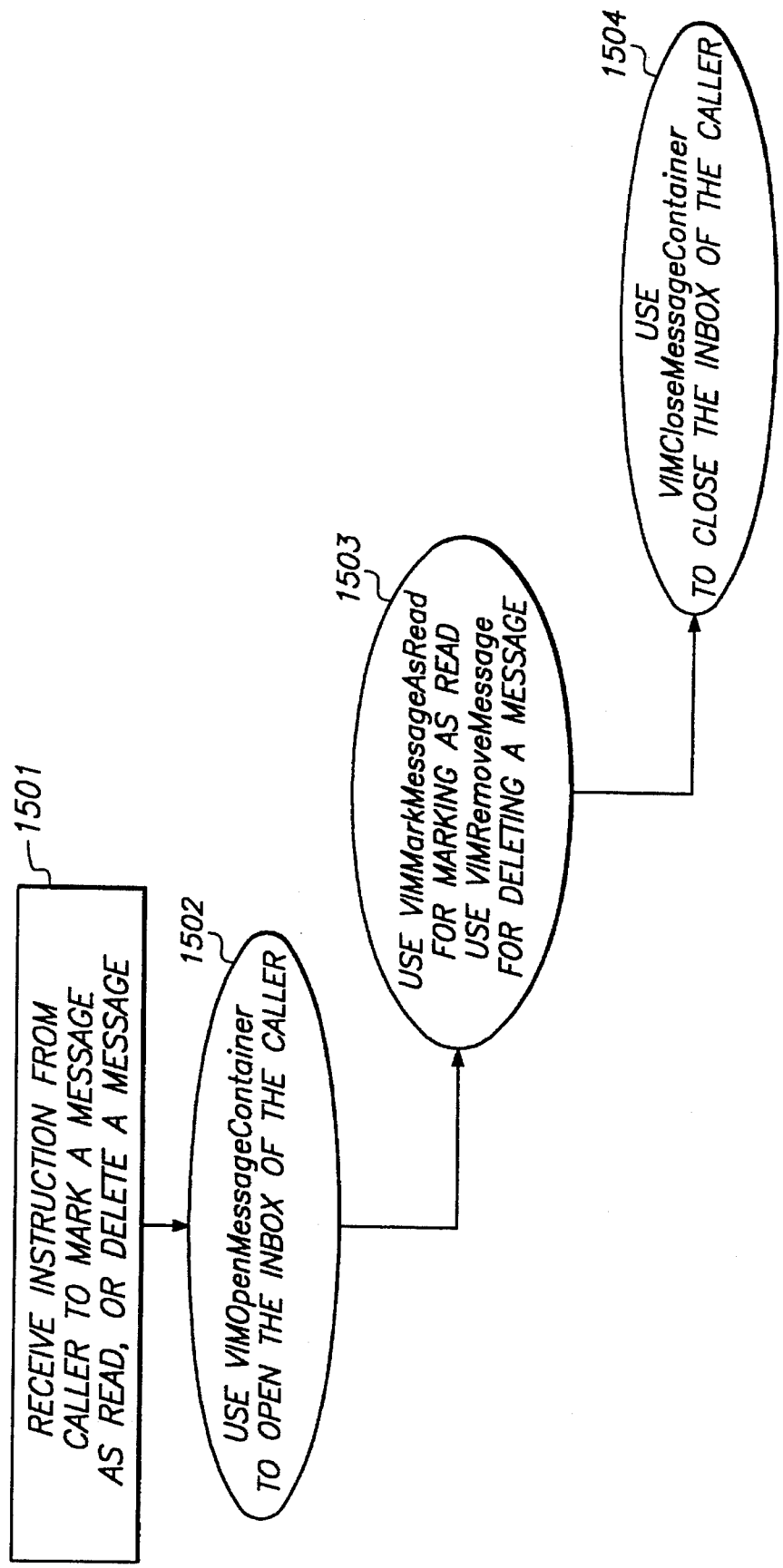
FIG. 15 is a flowchart showing the steps for marking as read and deleting messages for a VIM type E-mail system.

FIG. 15 is a flowchart showing the steps for marking as read and deleting messages for a VIM type E-mail system. In step 1501, the caller issues instructions to mark a message as read or to delete a message. The VIMOpenMessageContainer subroutine is used to open the Inbox of the caller, step 1502. One of two different subroutine calls is made, depending upon the instructions issued by the caller, step 1503. If the user wishes to mark a message as read, a call is made to the VIMMarkMessageAsRead subroutine. If the caller wishes to delete a message, a call is made to the VIMRemoveMessage subroutine. Lastly, in step 1504, the VIMCloseMessageContainer subroutine is used to close the inbox of the caller.

Figure 16:
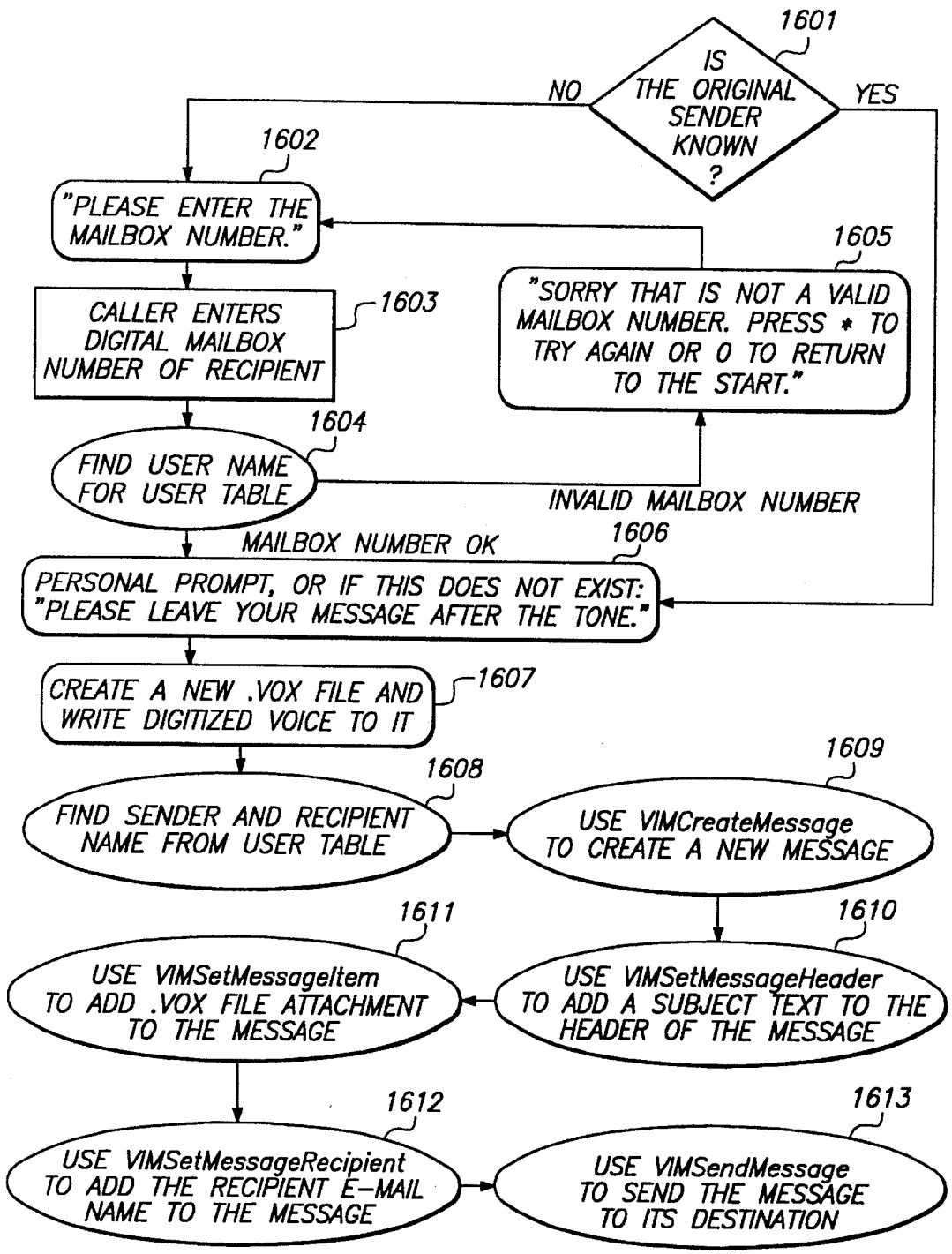
FIG. 16 is a flowchart showing the steps for replying to a message during message playback with a VIM type E-mail system.

FIG. 16 is a flowchart showing the steps for replying to a message during message playback for VIM applications.

Initially, a determination is made as to whether the original sender is known, step 1601. If so, the process jumps to step 1606. Otherwise, step 1602 prompts the user is prompted to "Please enter the Mailbox Number." In step 1603, the caller enters the voice mailbox number of the recipient. The user name is then located from the user table, step 1604. If it is an invalid mailbox number, step 1605 informs the user, "Sorry that is not a valid Mailbox Number. Press * to try again or 0 to return to the start." And step 1602 is repeated. If the mailbox number is valid, step 1606 gives a personal prompt. If this does not exist, the computer transmits, "Please leave your message after the tone." In step 1607, a new .vox file is created, and the digitized voice is written to it. The sender's and recipient's names are located from the user table, step 1608.

The VIMCreateMessage subroutine is used to create a new message, step 1609. VIMSetMessageHeader is used to add a subject text to the header of the message, step 1610. In step 1611, VIMSetMessageItem is used to add the .vox file attachment to the message. The VIMSetMessageRecipient subroutine is used to add the recipient's name to the message, step 1612. Finally, the VIMSendMessage subroutine is used to send the message to its destination.

By implementing API subroutine calls as described in the flowcharts of FIGS. 2–16 with the network of FIG. 1, and especially in light of Table 1, the implementation of a traditional voice message system using E-mail as the directory, security, and message handling mechanism is achieved. These traditional features included call answering and taking a message, logging on to a voice mailbox and creating and sending a voice message to a specific user, saving, and erasing messages, verifying security codes, and playing back messages to a user who has called in from a telephone to retrieve the messages. Other prior art voice message features such as reply and forward could also be implemented by one skilled in the art using the appropriate E-mail API functions that provide the corresponding operations.

As previously indicated the invention also includes features implemented in software at the PC or workstation on the LAN. As indicated in Table 1, these operations also use some of the E-Mail APIs for implementing their operation and some of the capabilities of the Microsoft Windows™ software. These operations will be explained by referring to FIG. 17.

Figure 17:
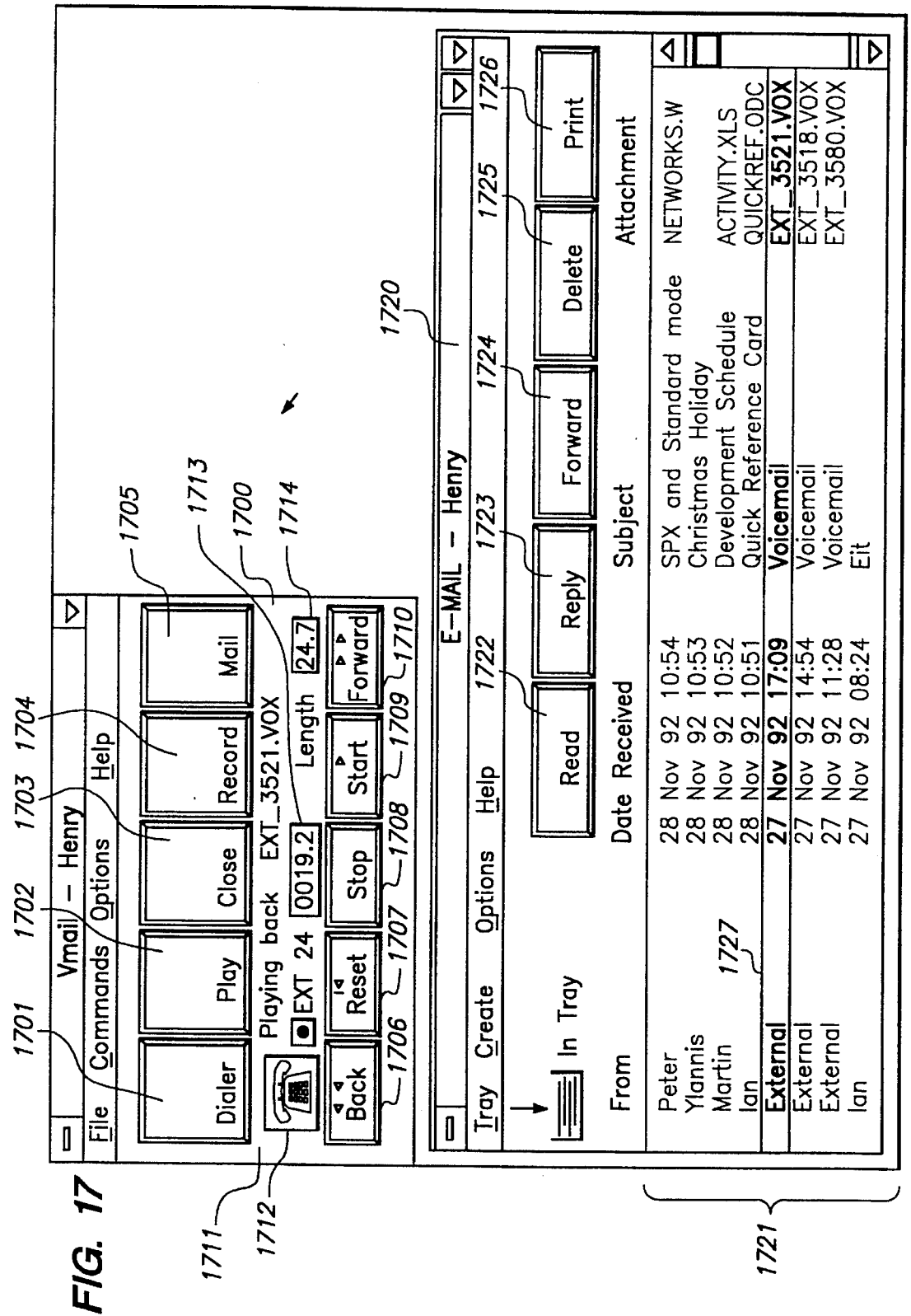
FIG. 17 shows a computer display as may be implemented for an integrated voice and electronic mail system.

FIG. 17 shows a PC Windows screen showing two windows. The top one, window 1700, is the screen showing the control specific to handling voice messages. The bottom one, window 1720, is the screen for a typical E-mail system. Numerous "buttons" are shown, 1701–1710 and 1722–1726, which are typically selected using a computer mouse or trackball.

As an example of the operation of selecting a voicemail message to be played, the user would select (click-on twice) message 1727. Because the attachment has a .vox extension, the Windows™ software will have been set up to activate a special application which will send a command to the voice gateway PC to tell it to use a telephone line to call the extension associated with the PC (e.g., Extension #24 in this case). When the user answers, he can use the controls in window 1700 to control the playback of the message (e.g., contained in file EXT_3521.VOX). Button 1706 is used to back up 10 seconds in the message and start playing from there. Button 1707 is used to back up and start playing from the beginning. Button 1708 stops playing and 1709 starts playing. Button 1710 skips forward 10 seconds. All the functions of buttons 1707–1710 are similar to the functions available to the known prior art voicemail systems except they use buttons on the screen rather than buttons on a phone. The commands are sent to the voice gateway PC via the LAN. Display 1713 shows how much of the voice message has been played and display 1714 shows its total length (in seconds). Button 1712 is used to force a hang-up of the telephone line from the voice gateway to the PBX when the user is finished. Display 1711 shows the name of the voice file being played.

In order to send a voice message to another user, the PC user would select the Record button 1704. For example, this would send a command to the voice gateway causing it to use a telephone line to call the extension number 24. When the user answers, he can use the tape recorder controls to start and stop recording and to playback what he has already recorded. As for play, these functions are implemented via commands from the PC via the LAN to the gateway and correspond to the prior art voice messaging functions used from a telephone and are similarly implemented. When the user is finished recording and wishes to send the message, he selects button 1705 (i.e., Mail). This uses the MAPISend-Documents or SMISendMail subroutine from MAPI or VIM to launch the E-mail application which will allow the user to address and send the message using the E-mail address collection screen. The recorded .vox voice file name is passed to the E-mail system to be sent as an attachment to the E-mail message.

The Dialer Button 1701 has nothing to do with voice messaging. It is provided as a convenience to the user. When it is selected, a directory screen is opened, which allows the user to select or enter a phone number to be called. The number is sent via the LAN to the voice gateway. The voice gateway calls the extension number associated with the PC (e.g., in this case, extension 24). When the user answers the extension, the voice gateway PC does a hook-switch flash to indicate to the PBX that it wishes to transfer the extension somewhere else. It then dials the phone number passed by the PC and hangs-up to complete the call transfer.

Window 1720 provides a user interface to the E-mail system. Since the present invention integrates the voicemail as part of the E-mail system, window 1720 provides a user interface with voicemail as well. Window 1720 includes a list 1721 of messages corresponding to a user's mailbox. List 1721 is broken into four columns. One column identifies the party that had sent the message. A second column gives the date that the message was sent. A third column identifies the subject of the message. If the message is a voice file, it is indicated as being "Voicemail". The fourth column lists any attachments. In the currently preferred embodiment, a user can point-and-click on any of the voice messages or icons for playback of that message.

Five buttons 1722–1726 are also displayed by window 1720. The Read Button 1722 allows a user to read text files (i.e., the E-mail messages). The Reply button 1723 lets the user reply to a received message, wherein the reply and the received message can be either voice or E-mail messages. The Forward Button 172 4 forwards a message to one or more other users. The Delete button 1725 deletes selected messages. The Print button 1726 produces a hard copy of a selected text file.

The operation of the invention to provide wide area voice messaging networking is entirely based on the E-mail system's wide area networking system. That is, commercially available E-mail systems such as Microsoft Mail™ and Lotus cc:Mail™ support the ability to send E-mail systems to users located on different LANs in locations throughout the world. These systems also support automatic directory update programs which propagate directory updates between these different LAN systems automatically. Because the voice messaging systems in voice files are attached to an E-mail message, they will be transferred to a wide area network of other systems just the same as regular E-mail. As described above, the E-mail directory is modified to add a mailbox address and an extension number. Thereupon it is scanned to build a User Table. In order to support wide area networking, as is offered in traditional voicemail systems, it is necessary to ensure that the mailbox addresses for each LAN system is unique across the entire wide area network. This can be achieved, for example, by assigning each LAN an additional three-digit location code that is attached to the front of the local user mailbox number. A user who receives an E-mail message with a voice message via a WAN, can play the voice message if there is an attached voice gateway PC. It is also possible to provide software on the PC which will convert the voice file from the voice encoding scheme provided by the voice boards in a PC gateway to the encoding used by voice boards (e.g., those made by SoundBlaster™ Inc.) in the desktop PC and thus play the voice through a speaker associated with the desktop PC. Note that it is also possible to take speech recorded by a microphone to a PC voice board and also to convert voice files to the encoding scheme used by the voice boards in the PC gateway for playing messages recorded on the PC over the phone lines.

Although the preferred embodiment of the invention uses VIM and MAPI for its implementation, there may evolve new E-mail APIs that would allow a similar implementation. Consequently, this disclosure is not meant to narrow the invention by showing the use of the VIM and MAPI examples. Further, it would be possible to design and implement an E-mail and a voice message system at the same time, both using the same directory and message handling systems. In other words, the voice messaging could be integrated into the E-mail function or vice versa by a company that has an existing E-mail or voice messaging system. The methods for doing this would be obvious to one skilled in the art based upon this disclosure.

Thus, an integrated voice and electronic mailing system is disclosed.

What is claimed is:

1. A method of integrating voice messages with text messages in an electronic mailing system comprising the steps of:

generating a single directory which contains a plurality of E-mail addresses, and extension numbers;

receiving a forwarded incoming telephone call; determining a called party's extension number;

recording a voice message from said incoming telephone call as a digital voice file;

attaching said voice file to an E-mail message as part of an E-mail system according to an application program interface of an E-mail system;

determining an E-mail mailbox address from said directory based on said extension number;

sending said E-mail message with its voice file in association with its mailbox address; and playing back said voice messages over a telephone.

\* \* \* \* \*

UNITED STATES PATENT AND TRADEMARK OFFICE
CERTIFICATE OF CORRECTION

PATENT NO. : 5,557,659            Page 1 of 2
DATED       : Sep. 17, 1996
INVENTOR(S) : Henry C.A. Hyde-Thomson It is certified that error appears in the above-identified patent and that said Letters Patent is hereby corrected as shown below:

In column 8, line 14, TABLE 1, table column 2, delete "K based" and insert --PC based--.

In column 8, line 14, TABLE 1, table column 3, delete "K based" and insert --PC based--.

In column 9, lines 34 and 35, TABLE 1, table column 1, delete
"Options during

Message Playback"

and insert      --Options during
Message Playback--.

In column 9, line 41, TABLE 1, table column 3, delete "vox f e" and insert --.vox file--.

UNITED STATES PATENT AND TRADEMARK OFFICE
CERTIFICATE OF CORRECTION

PATENT NO. : 5,557,659
DATED : Sep. 17, 1996
INVENTOR(S) : Henry C.A. Hyde-Thomson It is certified that error appears in the above-identified patent and that said Letters Patent is hereby corrected as shown below:

In column 14, line 54, delete "step 12 12" and insert --step 1212--.

Signed and Sealed this

Seventh Day of September, 1999

Attest:

Q. TODD DICKINSON

Attesting Officer     Acting Commissioner of Patents and Trademarks